United States Patent [19]

Hosoi et al.

[11] Patent Number: 5,576,774
[45] Date of Patent: Nov. 19, 1996

[54] CONVERGENCE ADJUSTING APPARATUS CAPABLE OF INDEPENDENTLY PERFORMING CONVERGENCE ADJUSTMENT ON ONE ADJUSTMENT POINT WITHOUT AFFECTING THE CONVERGENCE OF THE REMAINING ADJUSTMENT POINTS

[75] Inventors: Kenichiro Hosoi; Junya Ochi; Nobuaki Kobayashi, all of Tokyo, Japan

[73] Assignee: Pioneer Electronic Corporation, Tokyo, Japan

[21] Appl. No.: 262,030

[22] Filed: Jun. 17, 1994

[30] Foreign Application Priority Data

Jun. 18, 1993 [JP] Japan .................................. 5-148157
Jun. 13, 1994 [JP] Japan .................................. 6-130596

[51] Int. Cl.⁶ .................................................. H04N 3/26
[52] U.S. Cl. .................. 348/745; 348/806; 315/368.18; 315/368.21; 315/392
[58] Field of Search ........................... 348/745, 744, 348/806, 807; 315/368.11, 368.18, 368.21, 368.22, 368.23, 392; H04N 3/22, 3/26, 5/74, 9/31

[56] References Cited

U.S. PATENT DOCUMENTS

| | | | |
|---|---|---|---|
| 4,318,032 | 3/1982 | Kureha | 348/745 |
| 4,668,977 | 5/1987 | Ohno et al. | 348/778 |
| 4,835,602 | 5/1989 | Duwaer | 358/60 |
| 4,870,329 | 9/1989 | Ara | 315/368.11 |
| 4,961,030 | 10/1990 | Ogino et al. | 348/746 |
| 4,977,446 | 12/1990 | Shiomi et al. | 348/747 |
| 4,980,614 | 12/1990 | Yamada et al. | 315/368.13 |
| 5,039,923 | 8/1991 | Ogino et al. | 315/382 |
| 5,053,684 | 10/1991 | Nooyen | 315/392 |
| 5,298,985 | 3/1994 | Tsujihara et al. | 348/745 |

FOREIGN PATENT DOCUMENTS

| | | | |
|---|---|---|---|
| 61-277288 | 8/1986 | Japan | H04N 9/28 |
| 61-276481 | 12/1986 | Japan | H04N 3/26 |
| 62-123886 | 5/1987 | Japan | H04N 9/28 |
| 62-136971 | 6/1987 | Japan | H04N 3/26 |

OTHER PUBLICATIONS

Morgenstern, Bodo: Farbfernsehtechnik (Colour TV Technology) Stuttgart, B.G. Teubner 1989 S. 72–79.

Primary Examiner—Safet Metjahic
Assistant Examiner—Chris Grant
Attorney, Agent, or Firm—Sughrue, Mion, Zinn, Macpeak & Seas

[57] ABSTRACT

In a convergence adjusting apparatus, there are generated waveform signals for adjustment, each level of which becomes zero at a plurality of adjustment points on a display except for one adjustment point. The levels of the waveform signals for adjustment are adjusted in accordance with convergence adjusting signals, and a convergence deflection yoke is supplied with the waveform signals having adjusted levels. In the convergence adjusting apparatus, only a beam spot at any adjustment point subjected to adjustment is moved when convergence adjustment is effected, without affecting adjustment for other adjustment points.

18 Claims, 19 Drawing Sheets

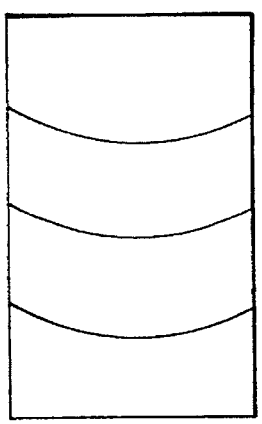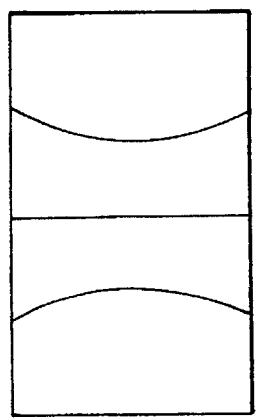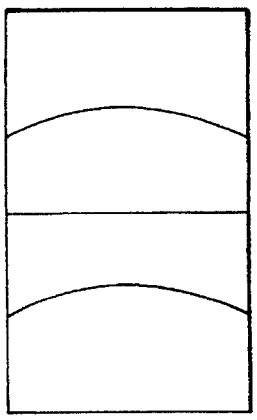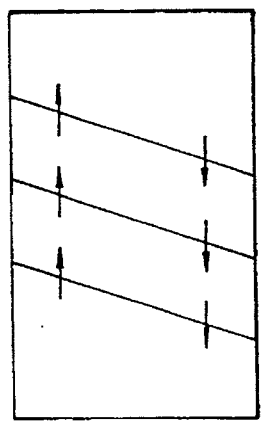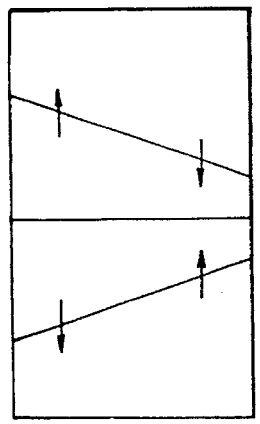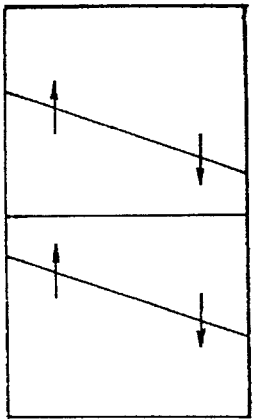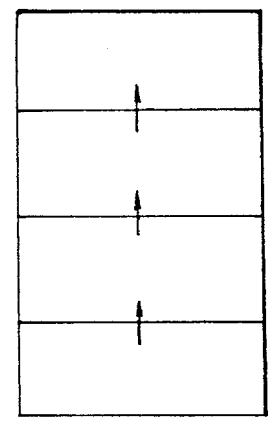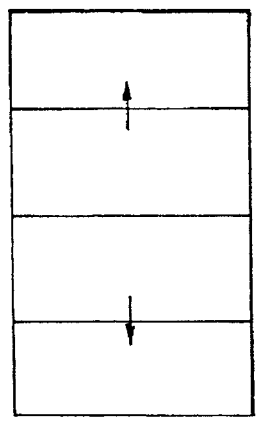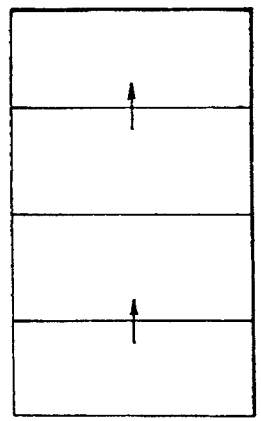

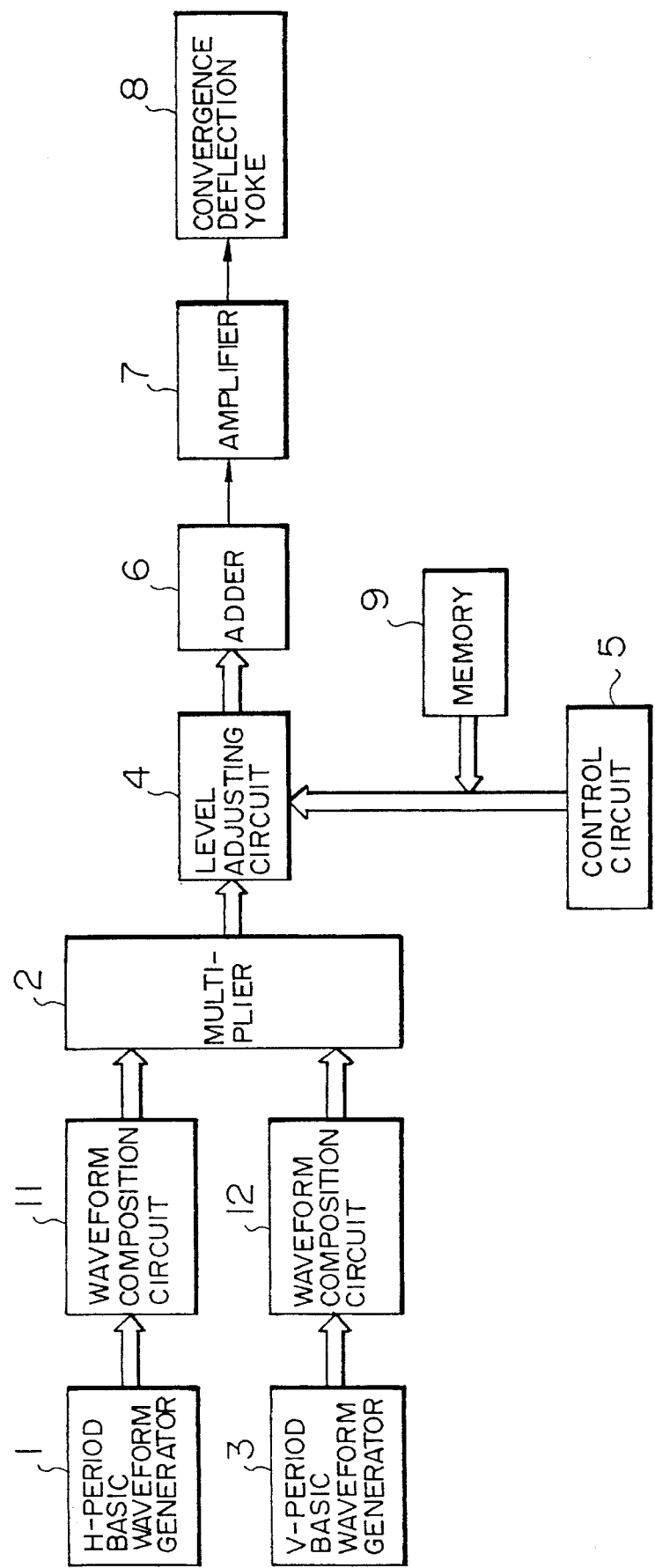

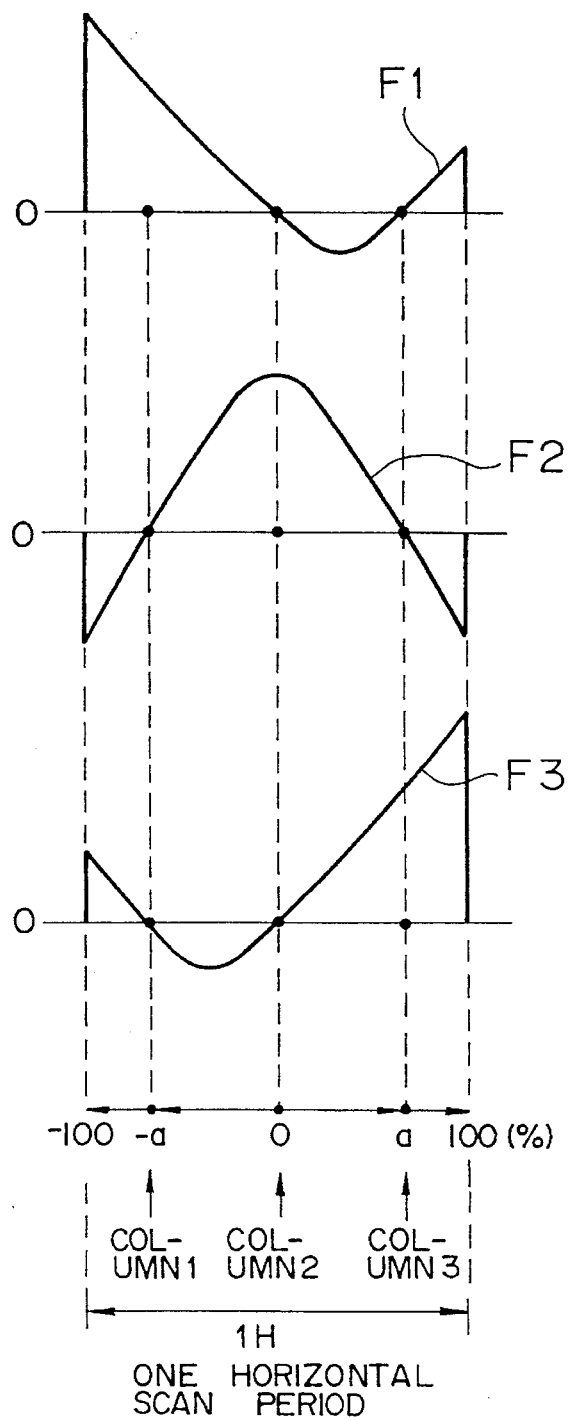
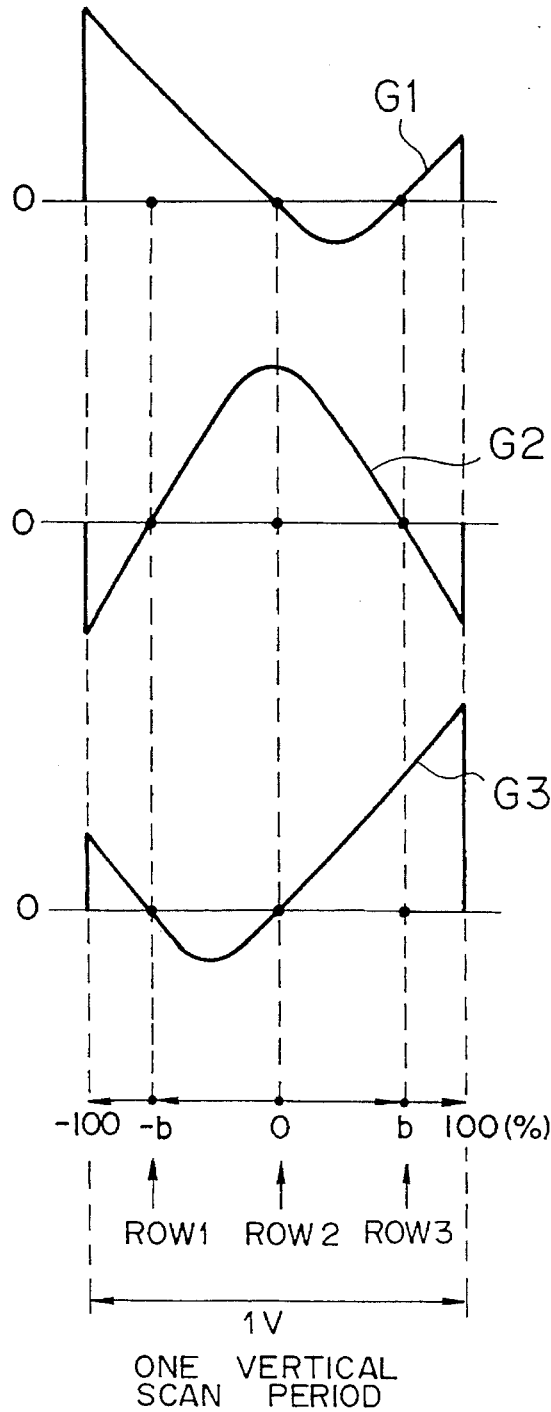

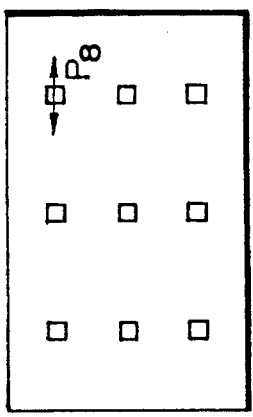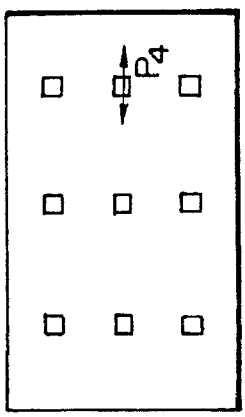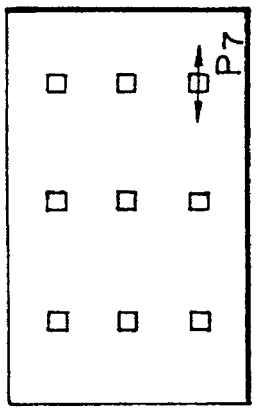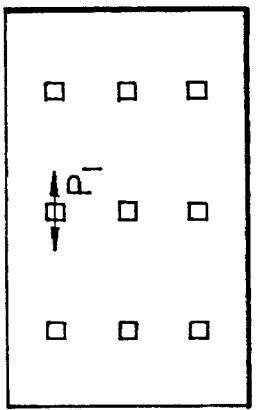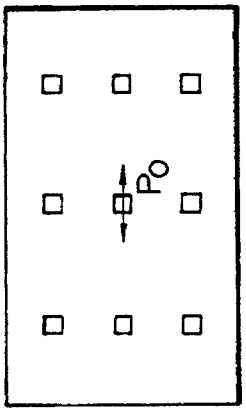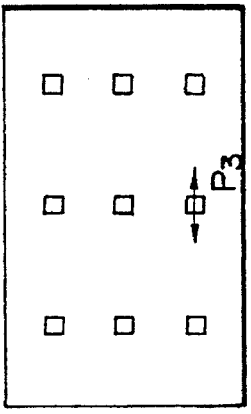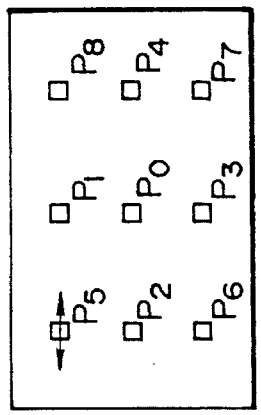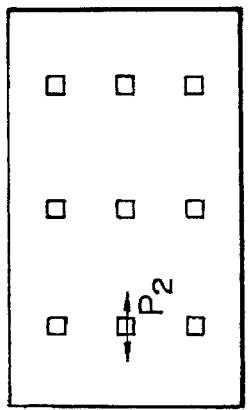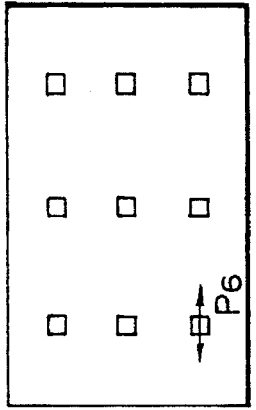

FIG. 10

| LEVEL ADJUSTING DEVICE | ADJUSTING POINT | MULTI-PLICATION | ROW | COLUMN |
|---|---|---|---|---|
| 41 | $P_5$ | $(F_1) \times (G_1)$ | 1 | 1 |
| 42 | $P_2$ | $(F_1) \times (G_2)$ | 2 | 1 |
| 43 | $P_6$ | $(F_1) \times (G_3)$ | 3 | 1 |
| 44 | $P_1$ | $(F_2) \times (G_1)$ | 1 | 2 |
| 45 | $P_0$ | $(F_2) \times (G_2)$ | 2 | 2 |
| 46 | $P_3$ | $(F_2) \times (G_3)$ | 3 | 2 |
| 47 | $P_8$ | $(F_3) \times (G_1)$ | 1 | 3 |
| 48 | $P_4$ | $(F_3) \times (G_2)$ | 2 | 3 |
| 49 | $P_7$ | $(F_3) \times (G_3)$ | 3 | 3 |

FIG. 13

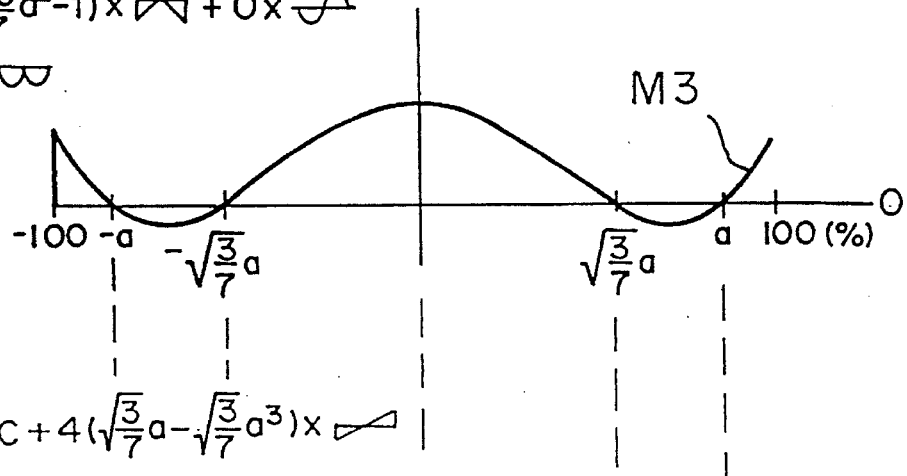

$$M3 = \frac{12}{7} \times DC + 0 \times \diagup$$
$$+ 4(\frac{10}{7}a^2 - 1) \times \diagdown\diagup + 0 \times \diagdown\diagup$$
$$+ 1 \times \diagdown\diagup$$

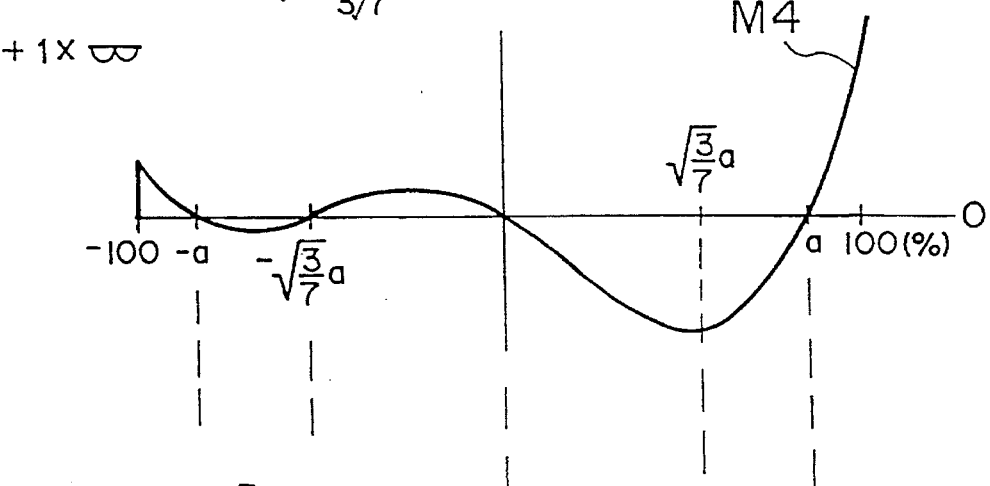

$$M4 = 0 \times DC + 4(\sqrt{\frac{3}{7}}a - \sqrt{\frac{3}{7}}a^3) \times \diagup$$
$$+ (-4)(1-a^2) \times \diagdown\diagup + (-\frac{8a}{3\sqrt{7}}) \times \diagdown\diagup$$
$$+ 1 \times \diagdown\diagup$$

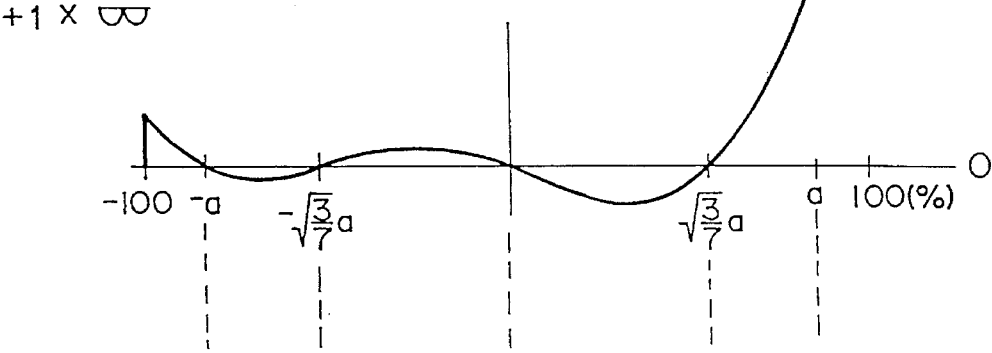

$$M5 = 0 \times DC + 4(a - \frac{3}{7}a^3) \times \diagup$$
$$+ -4(1 - \frac{3}{7}a^2) \times \diagdown\diagup + -\frac{8}{3\sqrt{7}} \times \diagdown\diagup$$
$$+ 1 \times \diagdown\diagup$$

COLUMN1 COLUMN2 COLUMN3 COLUMN4 COLUMN5
(ROW1)  (ROW2)  (ROW3)  (ROW4)  (ROW5)

CONTRACTION　　　　　　EXPANSION

EXPANSION　　CONTRAC-　CONTRAC-　　EXPANSION
　　　　　　　TION　　　TION

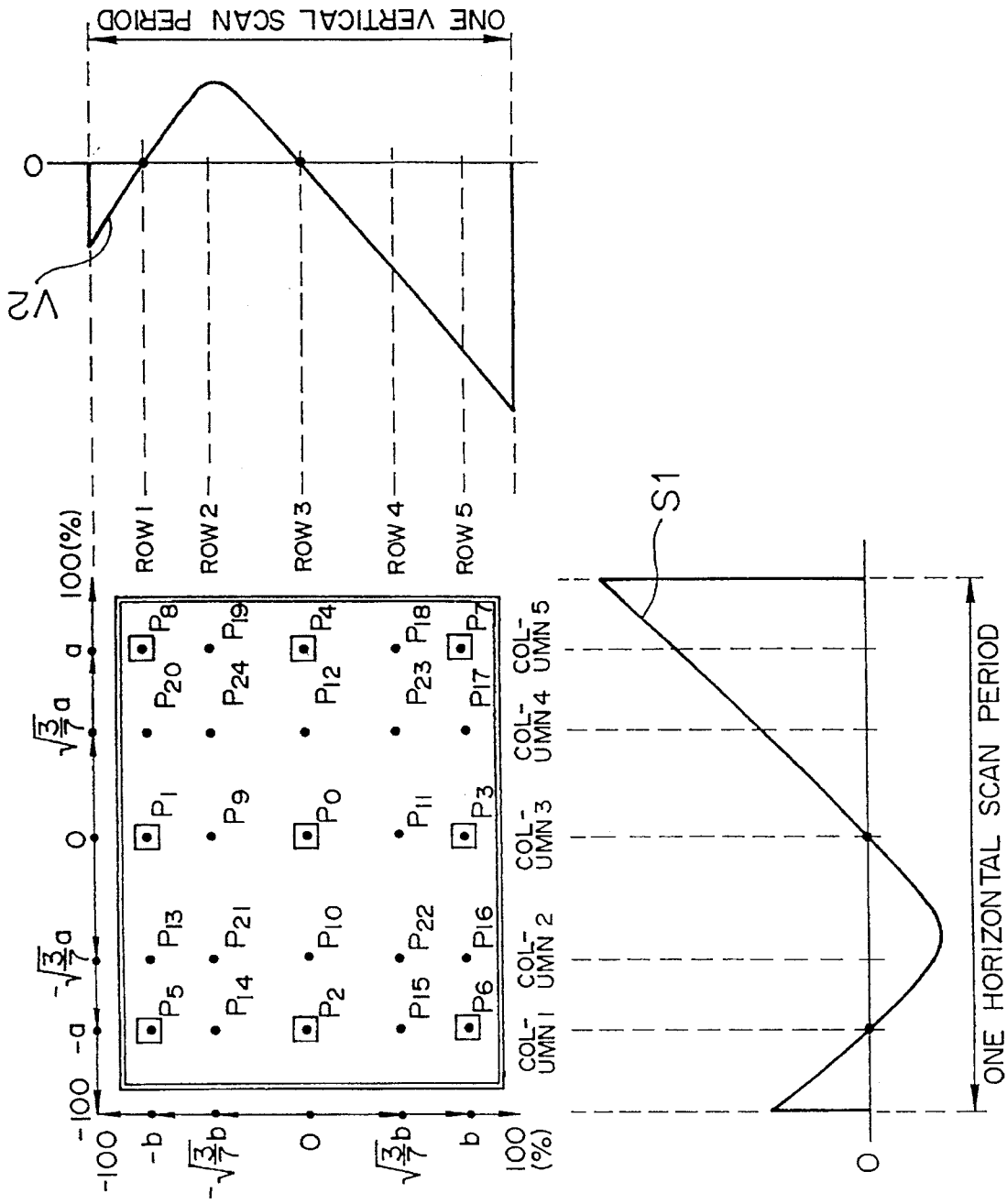

CONVERGENCE ADJUSTING APPARATUS CAPABLE OF INDEPENDENTLY PERFORMING CONVERGENCE ADJUSTMENT ON ONE ADJUSTMENT POINT WITHOUT AFFECTING THE CONVERGENCE OF THE REMAINING ADJUSTMENT POINTS

BACKGROUND OF THE INVENTION

1. Field of the Invention

The present invention relates to a convergence adjusting apparatus for a color display, and more particularly to a convergence adjusting apparatus for a front or rear projection television in which electron guns corresponding to the colors R, G and B are used.

2. Description of the Related Background Art

There is known a convergence adjusting apparatus for a color display which effects convergence adjustment for each of the adjustment points on a display.

FIG. 1 shows an example of the structure of such a prior art convergence adjusting apparatus.

In FIG. 1, an H-period basic waveform generator 1 generates a basic waveform signal A1 for the zero order component of a convergence signal (hereinafter referred to as "Conver. zero order") which is the DC component of the convergence signal, a basic waveform signal A2 for Convergence 1st order which is the first order component of the convergence signal, and a basic waveform signal A3 for Convergence second order which is the second order component, as shown in FIG. 2. These signals are supplied to a multiplier 2. The basic waveform signal A1 is a direct current signal having a predetermined level. The basic waveform signal A2 is a sawtooth waveform signal having a period equal to one horizontal scan period. The basic waveform signal A3 is a parabolic waveform signal having a period corresponding to one horizontal scan period.

A V-period basic waveform generator 3 generates a basic waveform signal B1, a basic waveform signal B2 and a basic waveform signal B3, as shown in FIG. 2, and supplies these signals to the multiplier 2. The basic waveform signal B1 is a direct current signal having a predetermined level. The basic waveform signal B2 is a sawtooth waveform signal having a period corresponding to one vertical scan period. The basic waveform signal B3 is a parabolic waveform signal having a period corresponding to one vertical scan period.

The multiplier 2 multiplies the basic waveform signals A1 to A3 and the basic waveform signals B1 to B3 together as described below to obtain waveform signals C1 to C9 for adjustment (hereinafter referred to as "adjustment-use waveform signals C1 to C9") and supplies the adjustment-use waveform signals to a level adjusting circuit 4.

(A1)×(B1)=(C1)
(A1)×(B2)=(C2)
(A1)×(B3)=(C3)
(A2)×(B1)=(C4)
(A2)×(B2)=(C5)
(A2)×(B3)=(C6)
(A3)×(B1)=(C7)
(A3)×(B2)=(C8)
(A3)×(B3)=(C9)

The level adjusting circuit 4 independently adjusts the levels of the adjustment-use waveform signals C1 to C9 in accordance with convergence adjusting signals supplied by a control circuit 5, and supplies resultant adjustment-use waveform signals D1 to D9 to an adder 6.

FIG. 3 shows the internal structure of the level adjusting circuit 4.

As shown in FIG. 3, the level adjusting circuit 4 comprises nine independent level adjusting devices 41 to 49, which are supplied with the above-mentioned adjustment-use waveform signals C1 to C9, respectively, as inputs. These level adjusting devices 41 to 49 adjust individual levels of the adjustment-use waveform signals C1 to C9 by amounts corresponding to the levels of convergence adjusting signals supplied by the control circuit 5, and they supply resultant adjusting waveform signals D1 to D9 to the adder 6.

The adder 6 adds up the adjusting waveform signals D1 to D9 to obtain a composite waveform signal and supplies the signal to an amplifier 7. The amplifier 7 amplifies the composite waveform signal as required and supplies a resultant amplified signal to a convergence deflection yoke 8.

Final levels of the convergence adjusting signals supplied to the level adjusting devices 41 to 49 at the time of completion of convergence adjustment, i.e. values indicating the levels of last supplied convergence adjusting signals to the level adjusting devices 41 to 49 are stored in a memory 9. After completion of convergence adjustment, the levels of convergence adjusting signals stored in the memory 9 are supplied to the corresponding level adjusting devices 41 to 49, respectively, for correction of convergence.

Independent convergence deflection yokes are provided for adjusting horizontal and vertical components, respectively, and also for adjusting a red component, a green component and a blue component (hereinafter referred to as R, G and B, respectively). Hence, each color display is provided with a total of six convergence adjusting apparatuses, each having the structure shown in FIG. 1.

In a convergence adjusting apparatus having the aforementioned structure, the current supplied to each convergence deflection yoke is changed by gradually changing the levels of the above-mentioned convergence adjusting signals, thereby moving beam spots of R, G and B irradiated on a display so as to converge to one spot and thus effecting convergence adjustment.

FIGS. 4A to 4I illustrate the fashion in which beam spots irradiated on the display move in accordance with a change in the levels of convergence adjusting signals. FIGS. 4A to 4I show effects of adjusting operations for the horizontal component.

For example, when the level of the convergence adjusting signal supplied to the level adjusting device 41 is shifted, beam spots move toward the right side of a display over the entire surface thereof, as shown in FIG. 4A. When the level of a convergence adjusting signal supplied to the level adjusting device 42 is shifted, beam spots in the upper portion of the display move to the right side thereof, and beam spots in the lower portion of the display move toward the left side thereof, as shown in FIG. 4B. When the level of a convergence adjusting signal supplied to the level adjusting device 43 is shifted, beam spots in the central portion of the display remain still and beam spots in the upper and lower portions of the display move toward the right side thereof, as shown in FIG. 4C.

As described above, convergence adjusting signals are selectively supplied to level adjusting devices for moving beam spots, thereby adjusting convergence such that beam spots of R, G and B converge at one spot for each of nine adjustment points P0 to P8 on the display shown in FIG. 5.

However, in an adjusting operation with such a convergence adjusting apparatus, adjustment for one adjustment point causes all beam spots on the display to concurrently move, as illustrated in FIGS. 4A to 4I. For example, when adjustment is effected for an adjustment point P7 after adjustment for an adjustment point P6 in FIG. 5 has been completed, the beam spot at the adjustment point P6 moves again, thus requiring another adjustment for the adjustment point P6. In other words, adjustment for each adjustment point must be performed while predicting how other beam spots at other adjustment points move.

Therefore, the conventional convergence adjustment requires skill. Particularly, in the case where convergence adjustment is performed at a place where a color display has been installed after shipment, it is necessary for an adjuster to pay attention to the movement of all other adjustment points when effecting adjustment of a certain adjustment point. Therefore, convergence adjustment requires a prolonged time and is not easy.

SUMMARY OF THE INVENTION

It is an objective of the present invention to solve the above-mentioned problems and to provide a convergence adjusting apparatus in which convergence adjustment can be performed easily.

A convergence adjusting apparatus according to the present invention is one in which convergence adjustment is effected for a plurality of adjustment points on a display on which a two-dimensional image is formed by a luminescence point moving in horizontal and vertical directions synchronously with horizontal and vertical synchronous signals. The convergence adjusting apparatus comprises basic waveform signal generating means for generating a sawtooth waveform signal as a first order waveform signal, a parabolic waveform signal as a second order waveform signal and an n-th order waveform signal, where n is an integer equal to or greater than 3, the sawtooth waveform signal, the parabolic waveform signal and the n-th order waveform signal being synchronous with the horizontal and vertical synchronous signals, adjustment-use waveform signal generating means for generating, synchronously with the vertical synchronous signals, waveform signals for adjustment based on each of the waveform signals obtained by the basic waveform signal generating means, each level of the waveform signals for adjustment becoming zero at the adjustment points on the display except for one adjustment point, and level adjusting means for adjusting the levels of the waveform signals for adjustment in accordance with convergence adjusting signals and for supplying a convergence deflection yoke with the waveform signals having adjusted levels.

In the convergence adjusting apparatus according to the present invention, waveform signals for adjustment are generated. The level of each signal becomes zero at a plurality of adjustment points on the display except for one adjustment point. The levels of the waveform signals for adjustment are adjusted in accordance with convergence adjusting signals, and a convergence deflection yoke is supplied with the waveform signals having adjusted levels. With this structure, convergence adjustment can be effected for any adjustment point leaving beam spots at other adjusting points stationary. Accordingly, it becomes possible to carry out a so-called point convergence. On the other hand, in the case where convergence adjustment is performed for a plurality of adjusting points, the convergence adjustment can be completed more quickly than the case in which convergence adjustment is effected using a waveform expressed by a function of Convergence 1st order corresponding to adjustments for the plurality of points. For example, in the case where adjustment is made for 25 points using a waveform expressed by a function including components up to Convergence 4th order, priority is given to the adjustment points and priority is also given to the Convergence zero order, 1st order and 2nd order in this order. This makes it possible to complete convergence adjustment in a short time when high-order distortion is small.

BRIEF DESCRIPTION OF THE DRAWINGS

FIGS. 4A to 4I are charts showing movement of beam spots caused by the convergence adjusting apparatus;

FIG. 6 is a diagram showing the structure of a convergence adjusting apparatus according to the present invention;

FIG. 7 is a chart showing an example of H-period adjustment-use waveform signals in the convergence adjusting apparatus according to the present invention;

FIG. 8 is a chart showing an example of V-period adjustment-use waveform signals in the convergence adjusting apparatus according to the present invention;

FIGS. 9A to 9I are charts showing movement of beam spots caused by the convergence adjusting apparatus according to the present invention;

FIG. 10 is a table showing the correspondence between level adjusting devices and adjustment points;

FIG. 13 is a chart showing another example of H-period adjustment-use waveform signals;

FIG. 16 is an explanatory chart for explaining nine-point adjustment;

DETAILED DESCRIPTION OF THE PREFERRED EMBODIMENTS

An embodiment of the present invention in which the present invention is applied to a convergence adjusting apparatus for effecting adjustment for nine points, arranged in 3×3 (horizontal×vertical) will be described below.

FIG. 6 shows the structure of a convergence adjusting apparatus according to this embodiment.

In FIG. 6, an H-period basic waveform generator 1 generates a basic waveform signal A1, a basic waveform signal A2 and a basic waveform signal A3 shown in FIG. 2, and supplies the signals to a waveform compositing circuit 11. The basic waveform signal A1 is a direct current signal having a predetermined level. The basic waveform signal A2 is a sawtooth waveform signal having a period corresponding to one horizontal scan period. The basic waveform signal A3 is a parabolic waveform signal having a period corresponding to one horizontal scan period.

The waveform compositing circuit 11 adjusts the levels of the basic waveform signals A1 to A3 as required and composites the level adjusted signals, thereby generating composite basic waveform signals F1 to F3 shown in FIG. 7. FIG. 7 shows only part of the composite basic waveform signals F1 to F3 corresponding to one horizontal period. The waveform compositing circuit 11 generates and repeatedly outputs composite basic waveform signals for each horizontal period.

Figure 5:
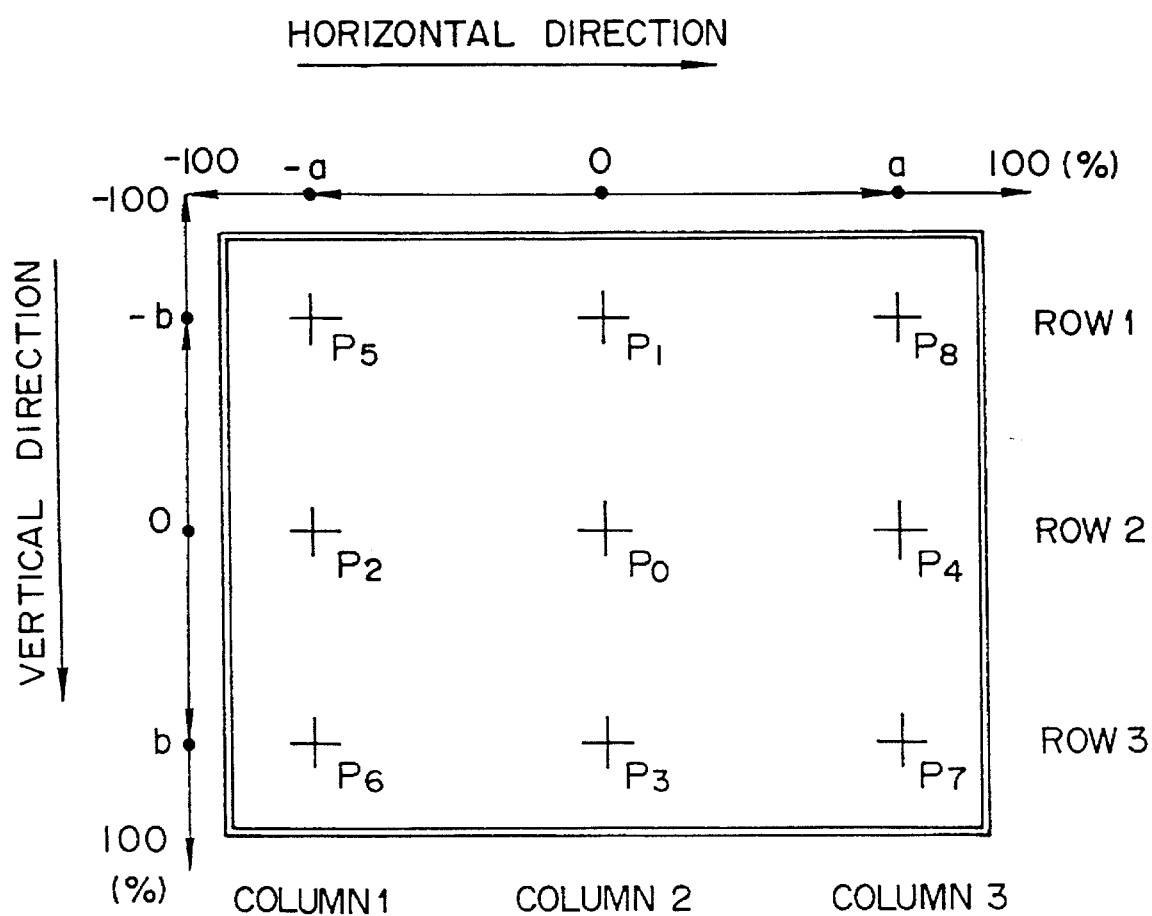
FIG. 5 is a chart showing convergence adjustment points on a display.

The composite basic waveform signal F1 is generated such that the level thereof becomes zero only in the position of column 2, wherein adjustment points P1, P0 and P3 exist, and the position of column 3, wherein adjustment points P8, P4 and P7 exist, among three horizontal positions on a display shown in FIG. 5. The composite basic waveform signal F2 is generated such that the level thereof becomes zero only in the position of column 1, wherein adjustment points P5, P2 and P6 exist, and the position of column 3, wherein adjustment points P8, P4 and P7 exist, among the three horizontal positions on a display shown in FIG. 5. The composite basic waveform signal F3 is generated such that the level thereof becomes zero only in the position of column 1, wherein adjustment points P5, P2 and P6 exist, and the position of column 2, wherein adjustment points P1, P0 and P3 exist, among the three horizontal positions on a display shown in FIG. 5.

A V-period basic waveform generator 3 generates a basic waveform signal B1, a basic waveform signal B2 and a basic waveform signal B3 shown in FIG. 2, and supplies the signals to a waveform compositing circuit 12. The basic waveform signal B1 is a direct current signal having a predetermined level. The basic waveform signal B2 is a sawtooth waveform signal having a period corresponding to one horizontal scan period. The basic waveform signal B3 is a parabolic waveform signal having a period corresponding to one horizontal scan period.

The waveform compositing circuit 12 adjusts the levels of the basic waveform signals B1 to B3 as required and composites the level adjusted signals, thereby generating composite basic waveform signals G1 to G3 shown in FIG. 8. FIG. 8 shows only part of the composite basic waveform signals G1 to G3 corresponding to one vertical period. The waveform compositing circuit 12 generates and repeatedly outputs the composite basic waveform signals for each vertical period.

The composite basic waveform signal G1 is generated such that the level thereof becomes zero only in the position of row 2, wherein adjustment points P2, P0 and P4 exist, and the position of row 3, wherein adjustment points P6, P3 and P7 exist, among three vertical positions on a display shown in FIG. 5. The composite basic waveform signal G2 is generated such that the level thereof becomes zero only in the position of row 1, wherein adjustment points P5, P1 and P8 exist, and the position of row 3, wherein adjustment points P6, P3 and P7 exist, among the three vertical positions on a display shown in FIG. 5. The composite basic waveform signal G3 is generated such that the level thereof becomes zero only in the position of row 1, wherein adjustment points P5, P1 and P8 exist, and the position of row 2, wherein adjustment points P2, P0 and P4 exist, among the three vertical positions on a display shown in FIG. 5.

In FIG. 5, the column 2 is the center position of the display in the horizontal direction. The column 3 is located to be apart from the center position in the positive horizontal direction by an amount corresponding to a% of half the horizontal period, and the column 1 is located to be apart from the center position in the negative horizontal direction by an amount corresponding to a% of half the horizontal period. The row 2 is the center position of the display in the vertical direction. The row 3 is located to be apart from the center position in the positive vertical position by an amount corresponding to b% of half the vertical period, and the row 1 is located to be apart from the center position in the negative vertical direction by an amount corresponding to b% of half the vertical period. The basic waveform signals shown in FIG. 2 are expressed as follows:

Basic waveform signal (A1, B1): $F(x)=DC$
(DC: level of direct current)
Basic waveform signal (A2, B2): $F(x)=X$
Basic waveform signal (A3, B3): $F(x)=-X^2$.

Expressions used for generating the above-mentioned composite basic waveform signals F1 to F3 and G1 to G3 are as follows:

$(F1)=0.(A1)+(-a).(A2)+(-1).(A3)$
$(F2)=a^2.(A1)+0.(A2)+1.(A3)$
$(F3)=0.(A1)+a.(A2)+(-1).(A3)$
$(G1)=0.(B1)+(-b).(B2)+(-1).(B3)$
$(G2)=b^2.(B1)+0.(B2)+1.(B3)$
$(G3)=0.(B1)+b.(B2)+(-1).(B3)$

A multiplier 2 multiplies the composite basic waveform signals F1 to F3 and the composite basic waveform signals G1 to G3 respectively, using the following formulas, to generate adjustment-use waveform signals H1 to H9, and supplies the generated signals to a level adjusting circuit 4. Each of the adjustment-use waveform signals H1 to H9 thus generated is a signal synchronized with each vertical period.

Figure 3:
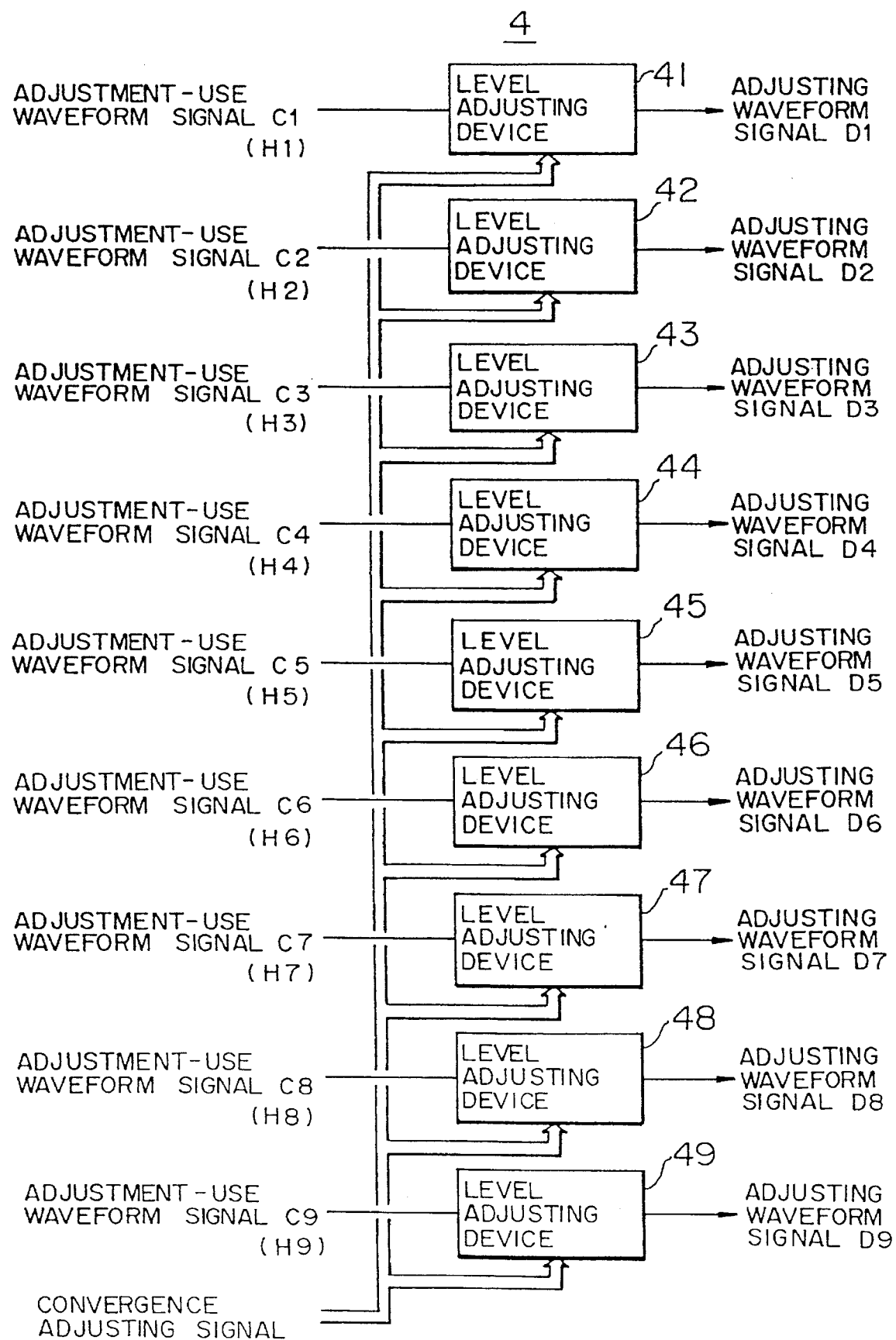
FIG. 3 is a diagram showing the internal structure of the level adjusting circuit in FIG. 1.

$(F1)\times(G1)=(H1)$
$(F1)\times(G2)=(H2)$
$(F1)\times(G3)=(H3)$
$(F2)\times(G1)=(H4)$
$(F2)\times(G2)=(H5)$
$(F2)\times(G3)=(H6)$
$(F3)\times(G1)=(H7)$
$(F3)\times(G2)=(H8)$
$(F3)\times(G3)=(H9)$ The level adjusting circuit 4 independently adjusts the levels of the adjustment-use waveform signals H1 to H9 by amounts corresponding to the levels of convergence adjusting signals supplied by a control circuit 5, and supplies resultant waveform signals to an adder 6. The level adjusting circuit 4 has the same structure as that shown in FIG. 3, and comprises nine independent level adjusting devices 41 to 49, which are supplied with the above-mentioned adjustment-use waveform signals H1 to H9, respectively, as inputs. These level adjusting devices 41 to 49 adjust individual levels of the adjustment-use waveform signals H1 to H9 by amounts corresponding to the levels of convergence adjusting signals supplied by the control circuit 5, and supply resultant adjusting waveform signals D1 to D9 to the adder 6.

The adder 6 adds up the adjusting waveform signals D1 to D9 to obtain a composite waveform signal and supplies the signal to an amplifier 7. The amplifier 7 amplifies the composite waveform signal as required and supplies a resultant amplified signal to a convergence deflection yoke 8.

A memory 9 stores final levels of the convergence adjusting signals supplied to the level adjusting devices 41 to 49 at the time of completion of convergence adjustment, i.e. values representing the levels of last supplied convergence adjusting signals to the level adjusting devices 41 to 49. After completion of convergence adjustment, the levels of convergence adjusting signals stored in the memory 9 are supplied to the corresponding level adjusting devices 41 to 49, respectively, for correction of convergence.

In the convergence adjusting apparatus according to the present invention having the above-mentioned constitution, a value of current supplied to each convergence deflection yoke is changed by gradually changing levels of the above-mentioned convergence adjusting signals, thereby moving beam spots of R, G and B irradiated on a display so as to converge at one spot and thus effecting convergence adjustment. At this time, by effecting the convergence adjustment for each of nine adjustment points, arranged in 3×3 (horizontal×vertical), on the display, a secondary convergence distortion can be eliminated from the entire surface of the display.

Referring to FIGS. 9A to 9I, description will be given to movements of beam spots during convergence adjustment by the convergence adjusting apparatus according to the present invention.

When a convergence adjusting signal is supplied, with a level thereof being changed as required, only to a level adjusting device 41 in the level adjusting circuit 4, only the beam spot at an adjustment point P5 on the display moves, as shown in FIG. 9A. At this time, the beam spot moves in the horizontal direction by an amount corresponding to the level of the convergence adjusting signal. In other words, supplied to the level adjusting device 41 is the adjustment-use waveform signal HI generated by multiplying together the composite basic waveform signal F1, whose level becomes zero at adjustment points in columns 2 and 3 in FIG. 5, and the composite basic waveform signal G1, whose level becomes zero at adjustment points in rows 2 and 3; hence, the levels of adjustment-use waveform signals are fixed to zero at all adjustment points except the adjustment point P5 located in row 1 and column 1. Thus, P5 is an only adjustment point where the level of the signal changes in accordance with convergence adjustment, and therefore, only the beam spot at the adjustment point P5 moves.

When a convergence adjusting signal is supplied, with a level thereof being changed as required, only to a level adjusting device 42 in the level adjusting circuit 4, only the beam spot at an adjustment point P2 on the display moves, as shown in FIG. 9B. At this time, the beam spot moves in the horizontal direction by an amount corresponding to the level of the convergence adjusting signal. In other words, supplied to the level adjusting device 42 is the adjustment-use waveform signal H2 generated by multiplying the composite basic waveform signal F1, whose level becomes zero at adjustment points in columns 2 and 3 in FIG. 5, and the composite basic waveform signal G2, whose level becomes zero at adjustment points in rows 1 and 3; hence, the levels of adjustment-use waveform signals are fixed to zero at all adjustment points except the adjustment point P2 located in row 2 and column 1. Thus, P2 is an only adjustment point where the level of the signal changes in accordance with convergence adjustment, and therefore, only the beam spot at the adjustment point P2 moves.

Likewise, a convergence adjusting signal is selectively supplied to each of level adjusting devices 43 to 49 in the level adjusting circuit 4, and the level of the convergence adjusting signal is changed as required. Accordingly, beam spots at other adjustment points individually move, as shown in FIGS. 9C to 9I.

FIG. 10 shows the relationship between level adjusting devices and adjustment points at which beam spots are moved by the level adjusting devices.

As described above, the convergence adjusting apparatus according to the present invention comprises an H-period basic waveform generator 1, a V-period basic waveform generator 3, waveform compositing circuits 11, 12 and a multiplier 2, and operates to generate adjustment-use waveform signals whose levels are zero at a plurality of adjustment points on the display except for one adjustment point, and to perform convergence adjustment by using the generated adjustment-use waveform signals.

Hence, at convergence adjusting operations, since the levels of adjusting waveform signals are fixed to zero for all adjustment points except one adjustment point subjected to adjustment, only a beam spot at a certain adjustment point to be adjusted moves.

In the above-mentioned embodiment, the waveform compositing circuits 11 and 12 are used to generate composite basic waveform signals shown in FIGS. 7 and 8, respectively, and thus generated composite basic waveform signals are multiplied each other at the multiplier 2 for obtaining the above-mentioned adjustment-use waveform signals H1 to H9. However, the adjustment-use waveform signals H1 to H9 may be obtained by effecting required arithmetic operations on adjustment-use waveform signals C1 to C9 which are output from a multiplier 2 shown in FIG. 1.

Figure 1:
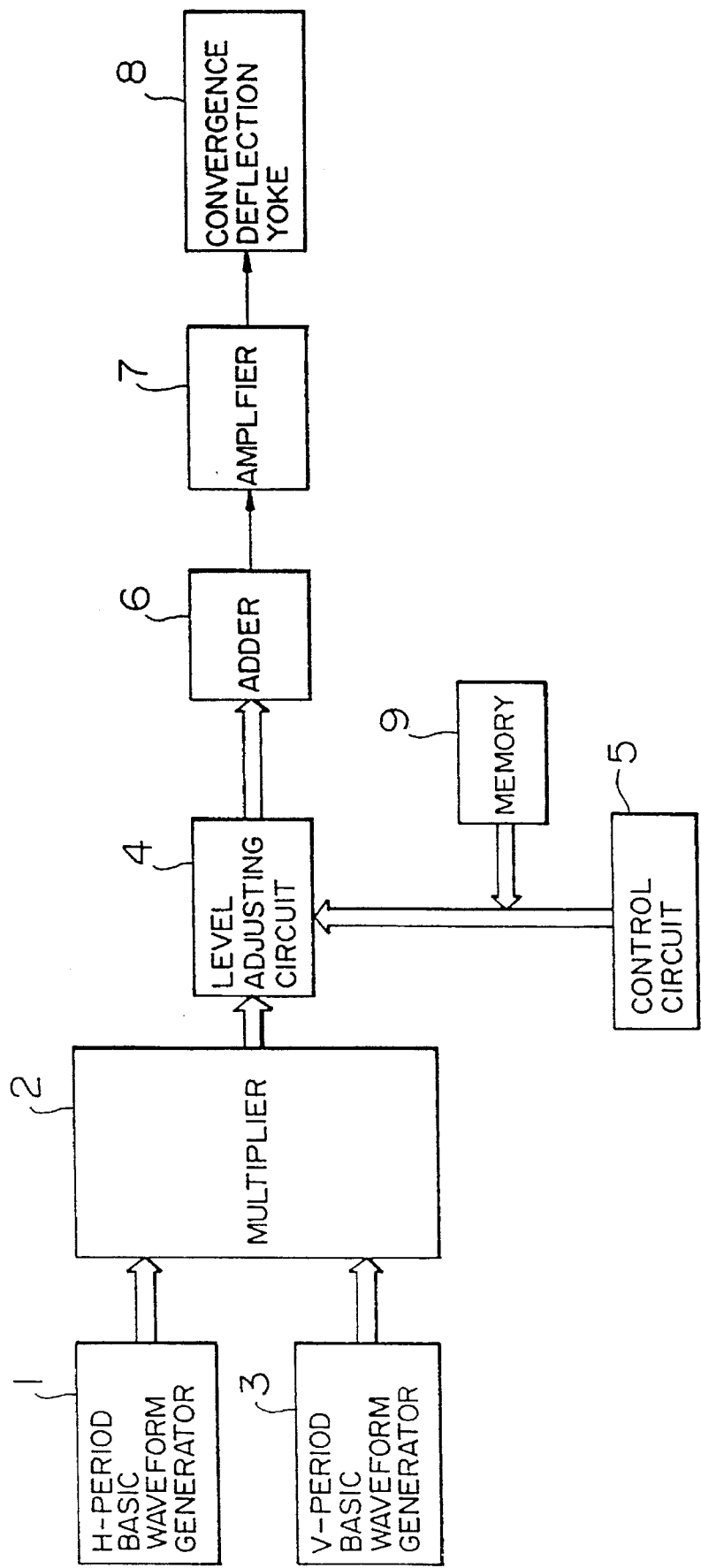
FIG. 1 is a diagram showing the structure of a convergence adjusting apparatus.
Figure 2A:
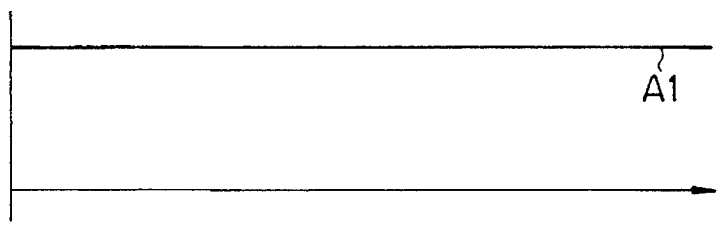
FIG. 2 is a chart showing basic waveform signals.
Figure 2B:
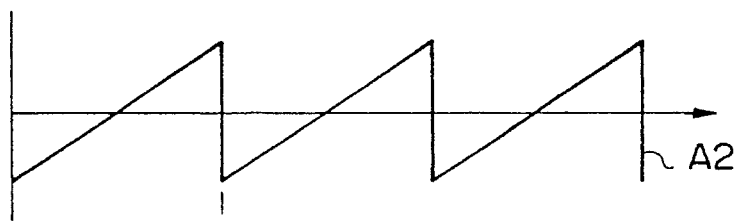
Figure 2C:
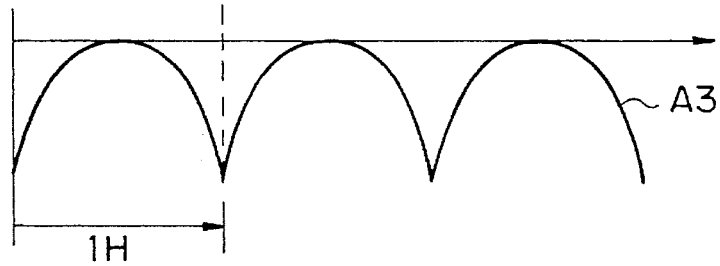
Figure 2D:
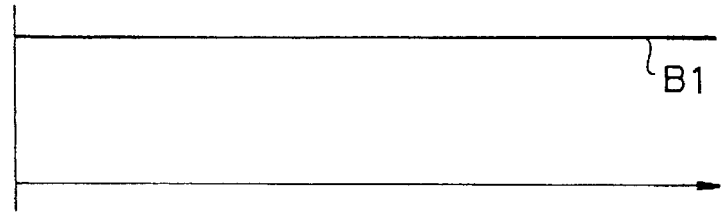
Figure 2E:
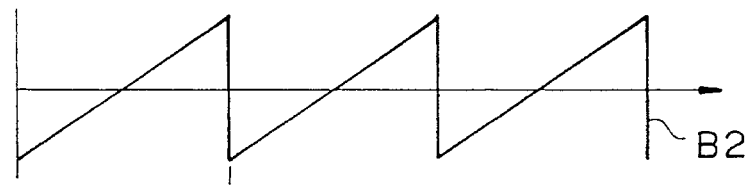
Figure 2F:
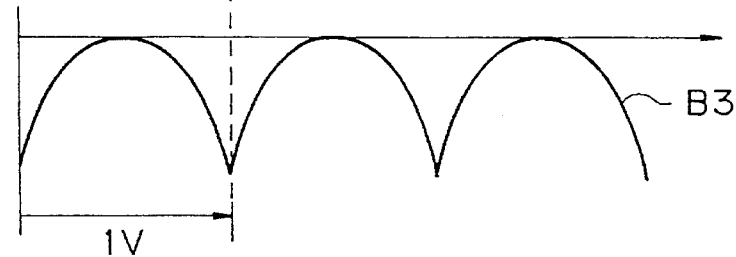

In other words, the convergence adjusting scheme according to the present invention can be realized in the arrangement shown in FIG. 1.

Next, description will be made on the arithmetic operations for obtaining adjustment-use waveform signals H1 to H9 from adjustment-use waveform signals C1 to C9.

First, since (H1)=(F1)×(G1) as mentioned above, (H1) is expressed as follows:

(H1)=[0.(A1)+(−a).(A2)+(−1).(A3)]×[0.(B1)+(−b).(B2)+(−1).(B3)]=0.(B1).(A1)+0.(B1).(−a).(A2) +0.(B1).(−1).(A3)+(−b).(B2).0(A1) +(−b).(B2).(·a).(A2)+(−b).(B2).(−1).(A3) +(−1).(B3).0.(A1)+(−1).(B3).(−a).(A2) +(−1).(B3).(−1).(A3)

Here, adjustment-use waveform signals C1 to C9 obtained from the multiplier 2 in FIG. 1 are expressed as follows:

(C1)=(A1).(B1)
(C2)=(A1).(B2)
(C3)=(A1).(B3)
(C4)=(A2).(B1)
(C5)=(A2).(B2)
(C6)=(A2).(B3)
(C7)=(A3).(B1)
(C8)=(A3).(B2)
(C9)=(A3).(B3)

Accordingly, (H1) is expressed by the following determinant:

$$(H1) = [0, 0, 0, 0, a \cdot b, a, 0, b, 1] \cdot \begin{bmatrix} (C1) \\ (C2) \\ (C3) \\ (C4) \\ (C5) \\ (C6) \\ (C7) \\ (C8) \\ (C9) \end{bmatrix}$$

Then, the above formula is rewritten as follows:

$$(H1) = K_1 \cdot \begin{bmatrix} (C1) \\ (C2) \\ (C3) \\ (C4) \\ (C5) \\ (C6) \\ (C7) \\ (C8) \\ (C9) \end{bmatrix}$$

Therefore, $K_1$ through $K_9$ for the adjustment-use waveform signals H1 to H9 are obtained as follows:

$K_1 = [0,0,0,0,a.b,a,0,b,1]$
$K_2 = [0,0,0,a.b^2,0,a,b^2,0,1]$
$K_3 = [0,0,0,0,a.b,-a,0,b,-1]$
$K_4 = [0,a^2.b,a^2,0,0,0,0,b,1]$
$K_5 = [a^2.b^2,0,a^2,0,0,0,b^2,0,1]$
$K_6 = [0,a^2.b,-a^2,0,0,0,0,b,-1]$
$K_7 = [0,0,0,0,a.b,a,0,-b,-1]$
$K_8 = [0,0,0,a.b^2,0,a,-b^2,0,-1]$
$K_9 = [0,0,0,0,a.b,-a,0,-b,1]$.

The adjustment-use waveform signal H1 is obtained by the equation described above. Therefore, the signal H1 is supplied to the convergence deflection yoke 8 for the convergence adjustment of the point corresponding to the signal H1. The adjustment-use waveform signals H2 through H9 are used for the convergence adjustment in the similar manner.

In the case of three electron guns, six pieces of a circuit portion following the multiplier 2 (i.e., the level adjusting circuit 4 through the amplifier 7) are provided in parallel. Values of the above-mentioned $K_1$ through $K_9$ are not constant integers, but contain some calculation error, and hence, approximate values may be taken for them. Also, even in the case where a software technique is used for effecting convergence adjustment, the basic principle used therein is the same as that for the above-mentioned hardware technique. With the development of programming technique and increasing speed of computation, the hardware technique can be employed more easily.

The above-mentioned embodiment has shown an example in which beam spots are moved in the horizontal direction, but needless to say, the vertical positions of the beam spots can be adjusted in the same manner. In other words, a difference is only whether an output from the amplifier 7 is supplied to a convergence deflection yoke for the horizontal direction or to a convergence deflection yoke for the vertical direction.

Also, the above-mentioned embodiment has shown an example of convergence adjustment effected for nine adjustment points, arranged in 3×3, as shown in FIG. 5, but the number of adjustment points is not limited to nine.

Figure 11:
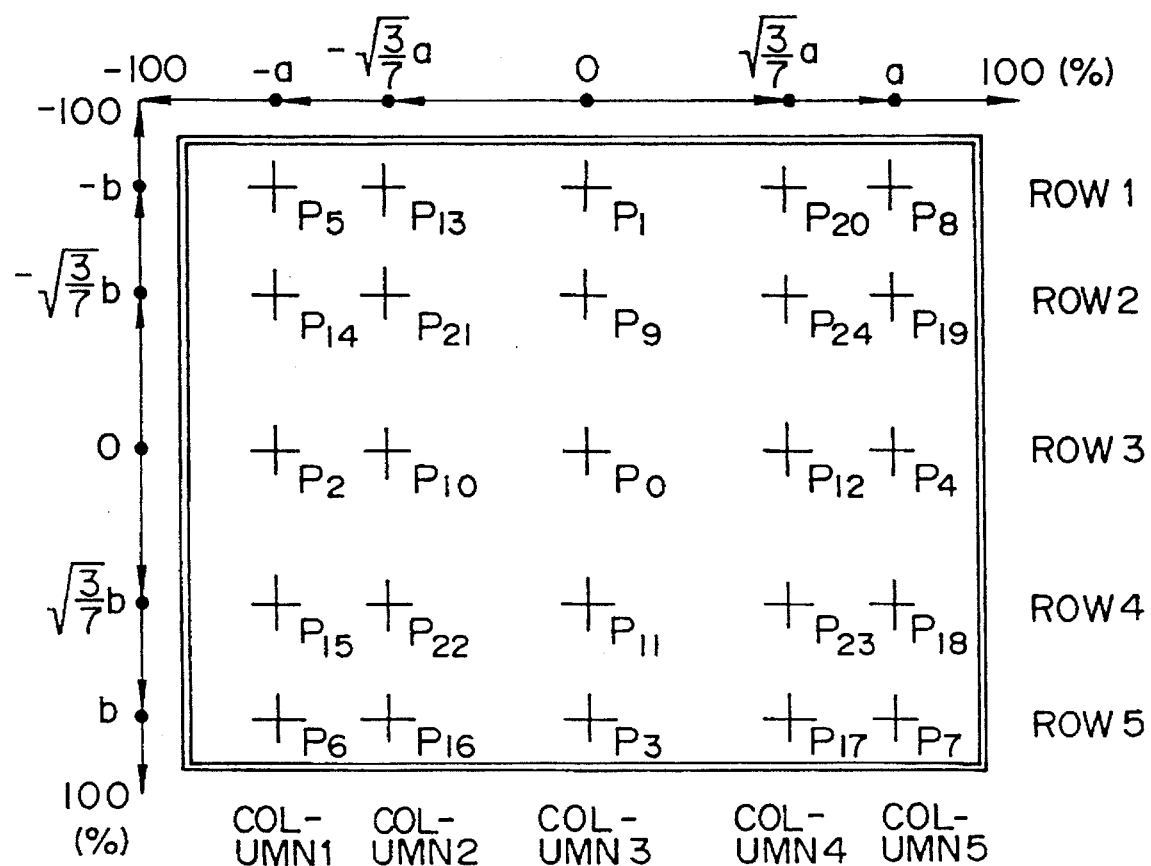
FIG. 11 is a chart showing convergence adjustment points on a display.

For example, it is also possible to effect convergence adjustment for 25 adjustment points, arranged in 5×5, on a display as shown in FIG. 11. In this case, as the waveform compositing circuits 11 and 12 shown in FIG. 6, waveform compositing circuits which generate composite basic waveform signals having waveforms like waveform signals M1 to M5 shown in FIGS. 12 and 13 are used.

Here, "a" represents the position of an adjustment point expressed in % when the portion of each horizontal scan in which an image signal exists is taken as 100%. Waveform signals M1 to M5 shown in FIGS. 12 and 13 are generated synchronously with horizontal and vertical synchronous signals, as in the aforementioned embodiment for 3×3=9 points. For example, composite basic waveform signals F1 to F5, synchronized with the horizontal synchronous signal, and composite basic waveform signals G1 to G5, synchronized with the vertical synchronous signal, are input to the multiplier 2. As a result, 25 kinds of point convergence adjusting waveform signals, i.e., adjustment-use waveform signals H1 to H25 are obtained. The levels of the obtained point convergence adjusting waveform signals are adjusted at the level adjusting circuit 4, and the adjusted signals are added up at the adder 6 for supply to a convergence deflection yoke.

Figure 12:
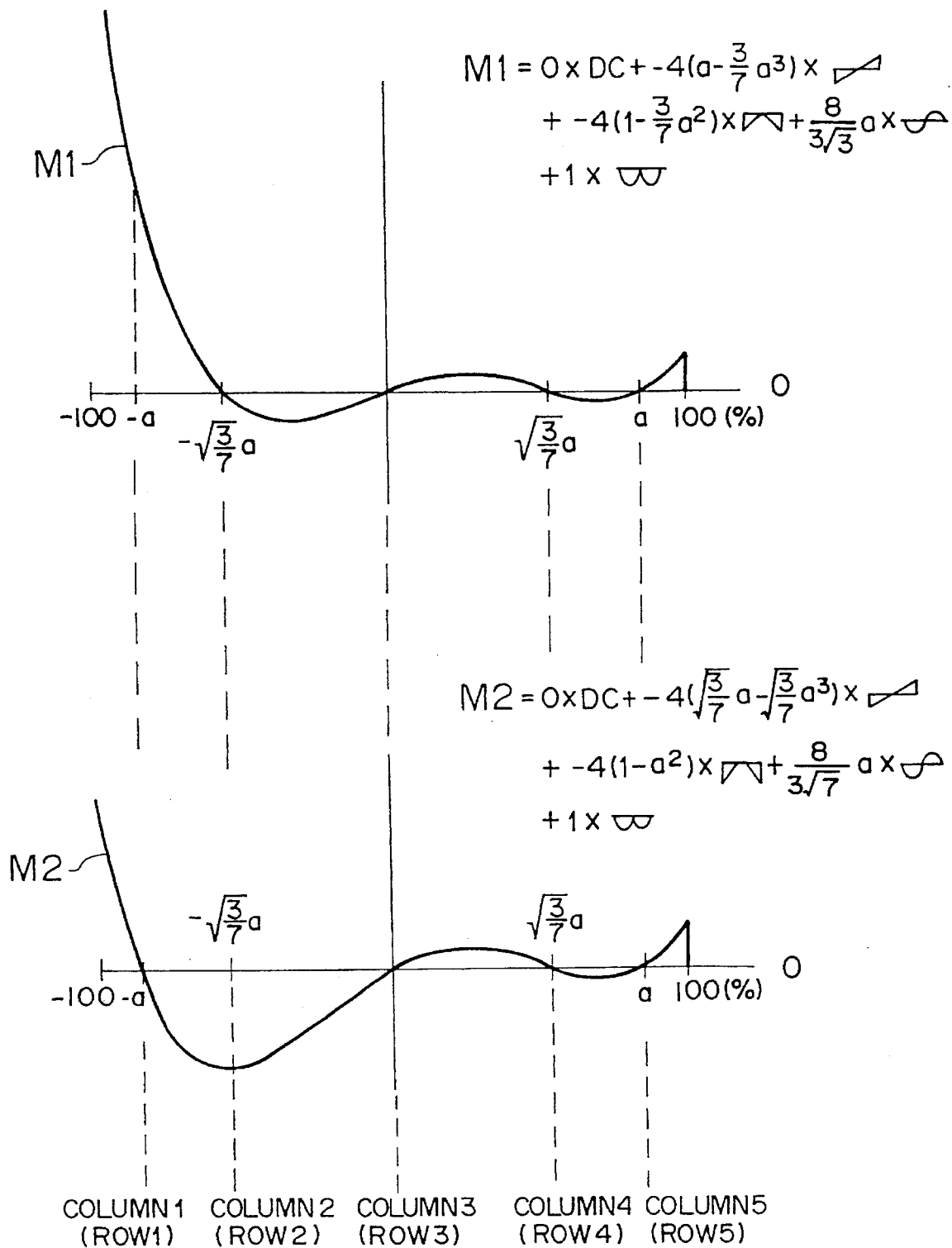
FIG. 12 is a chart showing another example of H-period adjustment-use waveform signals.

The waveform signal M1 shown in FIG. 12 is a signal which assumes a level other than zero only at adjustment points in column 1 (or row 1) among those in columns 1 to 5 (or rows 1 to 5) in FIG. 11, and the waveform signal M2 is a signal which assumes a level other than 0 only at adjustment points in column 2 (or row 2). The waveform signal M3 shown in FIG. 13 is a signal which assumes a level other than zero only at adjustment points in column 3 (or row 3) among those in columns 1 to 5 (or rows 1 to 5), and the waveform signal M4 is a signal which assumes a level other than 0 only at adjustment points in column 4 (or row 4). The waveform signal M5 shown in FIG. 13 is a signal which assumes a level other than zero only at adjustment points in column 5 (or row 5) among those in columns 1 to 5 (or rows 1 to 5) in FIG. 11.

In the above-described embodiment, the closer to 100% the value "a" is, the closer to the frame of the display the convergence adjustment can be effected. When the value "a" is set to be close to 100%, and the adjustment points in column 2 and column 4 are determined to be positioned at $-a\sqrt{3/7}$ and $a\sqrt{3/7}$, respectively, the amplitude of movement of a beam spot at each adjustment point becomes the maximum among the amplitudes at points between the zero cross points.

Moreover, the movement of the beam spot by the point adjustment is extended as a result of the broadening of the dynamic range of the amplitude value, so that the easiness of adjustment is increased.

The above FIG. 12 and FIG. 13 show an example of waveform signals which are used in the case where the positions of the adjustment points in column 2 and column 4 are $-a\sqrt{3/7}$ and $a\sqrt{3/7}$, respectively, and the waveform signals are not limited thereto. For example, when the positions of the adjustment points in column 2 and column 4 are −0.5a and 0.5a, the waveform signals M1 and M3 to M5 are determined such that the position −0.5a becomes the zero cross points of the waveform signals M1 and M3 to M5 and the waveform signal M2 is determined such that the waveform signal M2 becomes the minimum (other than zero) at the position—0.5a. Further, the waveform signals M1, M2, M3 and M5 are determined such that the position 0.5a becomes the zero cross points of the waveform signals M1, M2, M3 and M5, and the waveform signal M4 is determined such that the waveform signal M4 becomes the minimum (other than zero) at the position 0.5a.

Needless to say, such an increase in the number of waveform signals causes the size of the multiplier 2, the level adjusting circuit 4 and the adder 6 to increase accordingly. For example, in this case, the level adjusting circuit 4 comprises 25 level adjusting devices.

Also, in this 25-point adjustment, a software technique is employed. In other words, basic waveform signals generated by the H-period basic waveform generator 1 and the V-period basic waveform generator 3 are expressed as follows:

Basic waveform signal (A1, B1): $F(x)=DC$ (DC: level of direct current)

Basic waveform signal (A2, B2): $F(x)=X$

Basic waveform signal (A3, B3): $F(x)=-X^2$

Basic waveform signal (A4, B4): $F(x)=(-3/2).\sqrt{3X}(X^2-1)$

Basic waveform signal (A5, B5): $F(x)=4X^2(X^2-1)$

Hence, coefficients $K_1$ to $K_{25}$ are calculated based on the basic waveform signals for generating adjustment-use waveform signals H1 to H25. As a result of this adjustment, if a convergence distortion has a waveform of an order not higher than fourth order, complete convergence adjustment can be carried out.

In the above-described embodiment, $F(x)=X$ is used as the formula of Cover. 1st order, $F(x)=-X^2$ as the formula of Convergence 2nd order, $F(x)=(-3/2).\sqrt{3X}(X^2-1)$ as the formula of Convergence 3rd order, and $F(x)=4X^2.(X^2-1)$ as the formula of Convergence 4th order. However, the waveform signals are not limited to those expressed by the above formulas. For example, operation based on the same principle can be carried out even when $F(x)=X^2$ is used as the formula of Convergence 2nd order, $F(x)=X^3$ as the formula of Convergence 3rd order, and $F(x)=X^4$ as the formula of Convergence 4th order.

Here, it is to be noted that a convergence distortion causing deviations of beam spots at many adjustment points is a distortion of a low order, while a convergence distortion causing deviations of beam spots at fewer adjustment points is a distortion of a higher order. In the above-described 25-point adjustment, convergence distortion of a higher order (4th order) is adjusted by using the waveforms of 4th order shown in FIG. 12 and FIG. 13. However, when convergence distortion is of 2nd order or a lower order, the number of points to be adjusted is small. In this case, it is not necessary to adjust all of the aforementioned 25 points.

Next, the adjustment steps of the 25-point convergence adjustment will be described below.

Figure 14:
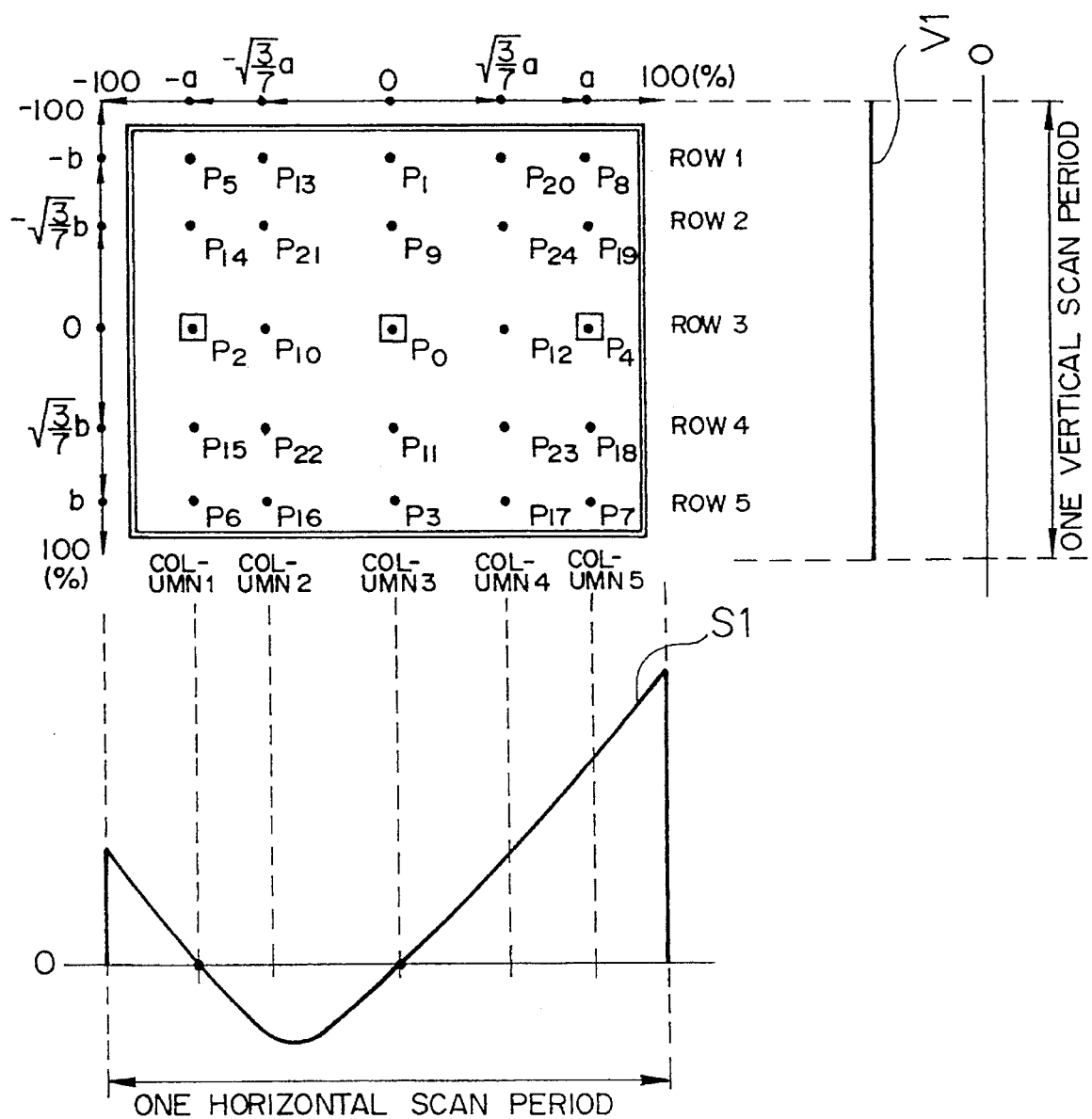
FIG. 14 is an explanatory chart for explaining three-point adjustment.

First, adjustment is made for three adjustment points P2, P0 and P4 shown in FIG. 14. At this time, adjustment for each of the points P2, P0 and P4 is carried out by using an adjustment-use waveform signal obtained by multiplying together a second order waveform signal S1 and a direct current waveform signal V1 shown in FIG. 14. FIG. 14 shows an example of the second order waveform signal S1 used in adjustment for the point P4, and the second order waveform signal S1 is a waveform signal of 2nd order which becomes zero only at the adjustment points in the first and third columns. When adjustment is effected for the adjustment point P0, a second order waveform signal S1 which becomes zero only at the adjustment points in the first and fifth columns is used. Similarly, when adjustment is effected for the adjustment point P2, a second order waveform signal S1 which becomes zero only at the adjustment points in the third and fifth columns is used. When the beam spots at the adjustment points P0, P2 and P4 respectively reach their target points by the above-described three-point adjustment, beam spots at other 22 points also reach their target points. Although the above-described three-point adjustment uses the second order waveform signals S1 for the horizontal direction and the direct current waveform signals V1 for the vertical direction, there is a case in which direct current waveform signals are used for the horizontal direction and second order waveform signals for the vertical direction. In this case, it is sufficient to carry out adjustment for three adjustment points P3, P0 and P1 in the third column, for example.

Figure 15A:
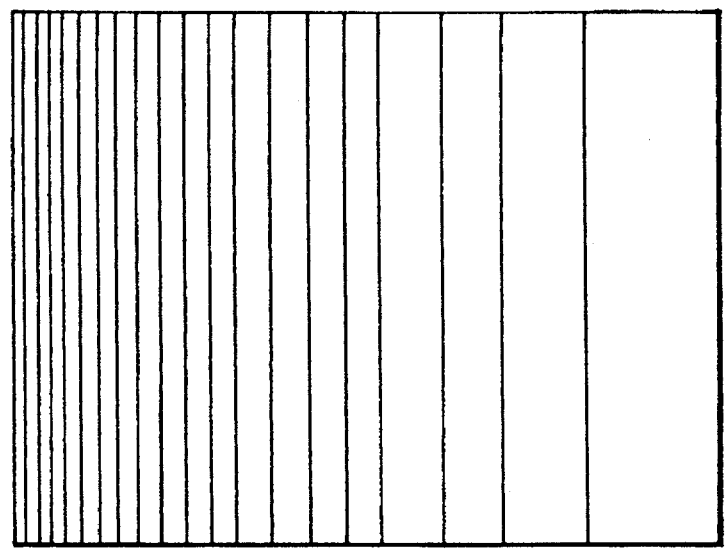
FIGS. 15A and 15B are charts showing second order distortion.
Figure 15B:
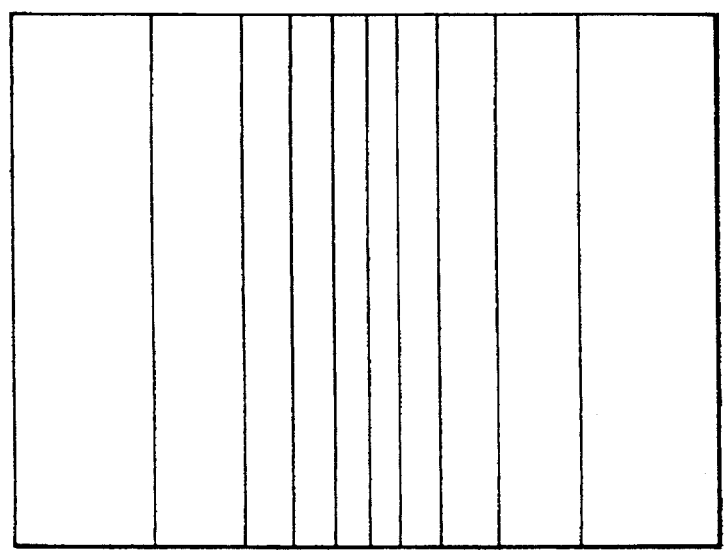

By carrying out such three-point adjustment, it is possible to compensate convergence distortion of second order as shown in FIG. 15A and FIG. 15B in which the linearity and size along a horizontal axis are shown. Further, by carrying out the three-point adjustment, it is possible to judge whether or not convergence distortion occurring on the display is distortion of an order higher than second order.

When sufficient compensation cannot be carried out by the three-point adjustment, adjustment is carried out for nine points P0 to P8 shown in FIG. 16. At this time, adjustment for each of the points P0 through P8 is carried out, in the manner similar to that for the afore described nine-point adjustment, by using an adjustment-use waveform signal obtained by multiplying together a second order waveform signal S1 and a second order waveform signal V2 shown in FIG. 16. When the beam spots at the adjustment points P0 through P8 respectively reach their target points after the completion of the above-described nine-point adjustment, beam spots at remaining 16 points also reach their target points.

Figure 17:
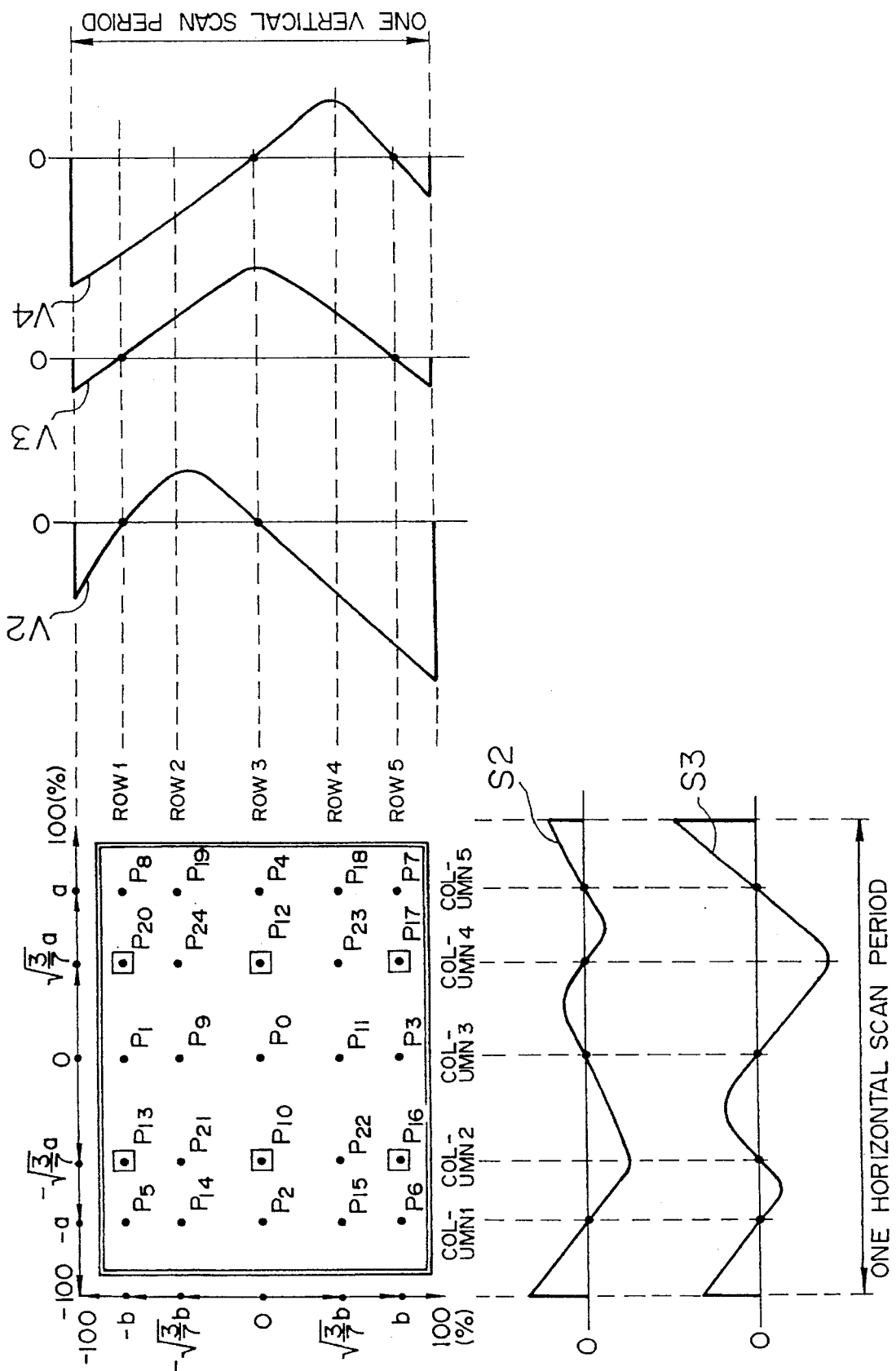
FIG. 17 is an explanatory chart for explaining six-point adjustment.

Moreover, when sufficient compensation cannot be carried out by the nine-point adjustment, adjustment is carried out for six points P10, P12, P13, P16, P17 and P20 shown in FIG. 17 with priority. At this time, adjustment for each of the six points P10, P12, P13, P16, P17 and P20 is carried out by using adjustment-use waveform signals obtained by multiplying together each of fourth order waveform signals S2 and S3 and each of second order waveform signals V2 to V4 shown in FIG. 17.

Figure 18:
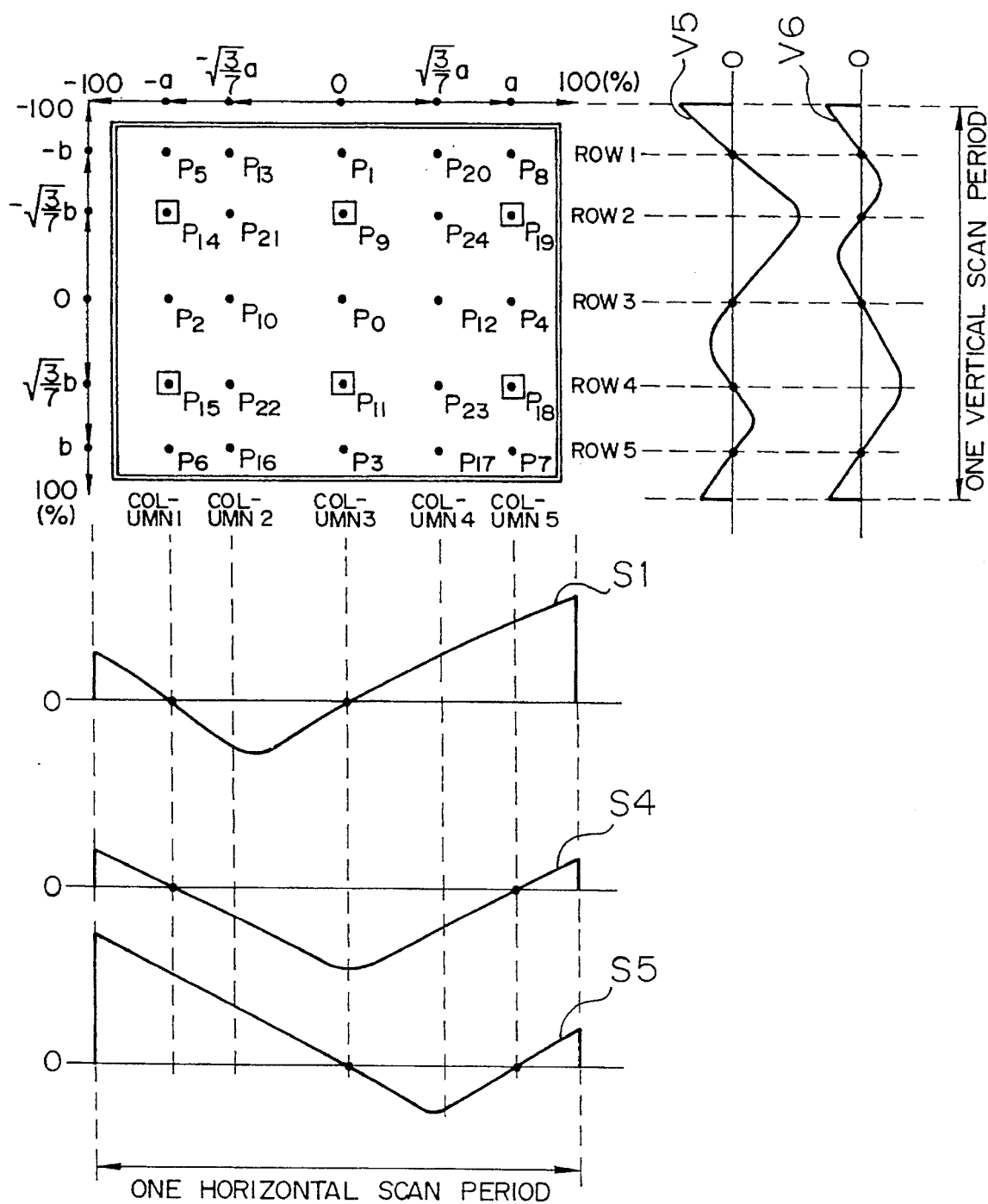
FIG. 18 is an explanatory chart for explaining six-point adjustment.

Similarly, adjustment is carried out for six points P9, P11, P14, P15, P18 and P19 shown in FIG. 18 with priority. At this time, adjustment for each of the six points P9, P11, P14, P15, P18 and P19 is carried out by using adjustment-use waveform signals obtained by multiplying together each of second order waveform signals S1, S4 and S5 and each of fourth order waveform signals V5 and V6 shown in FIG. 18.

Figure 19:
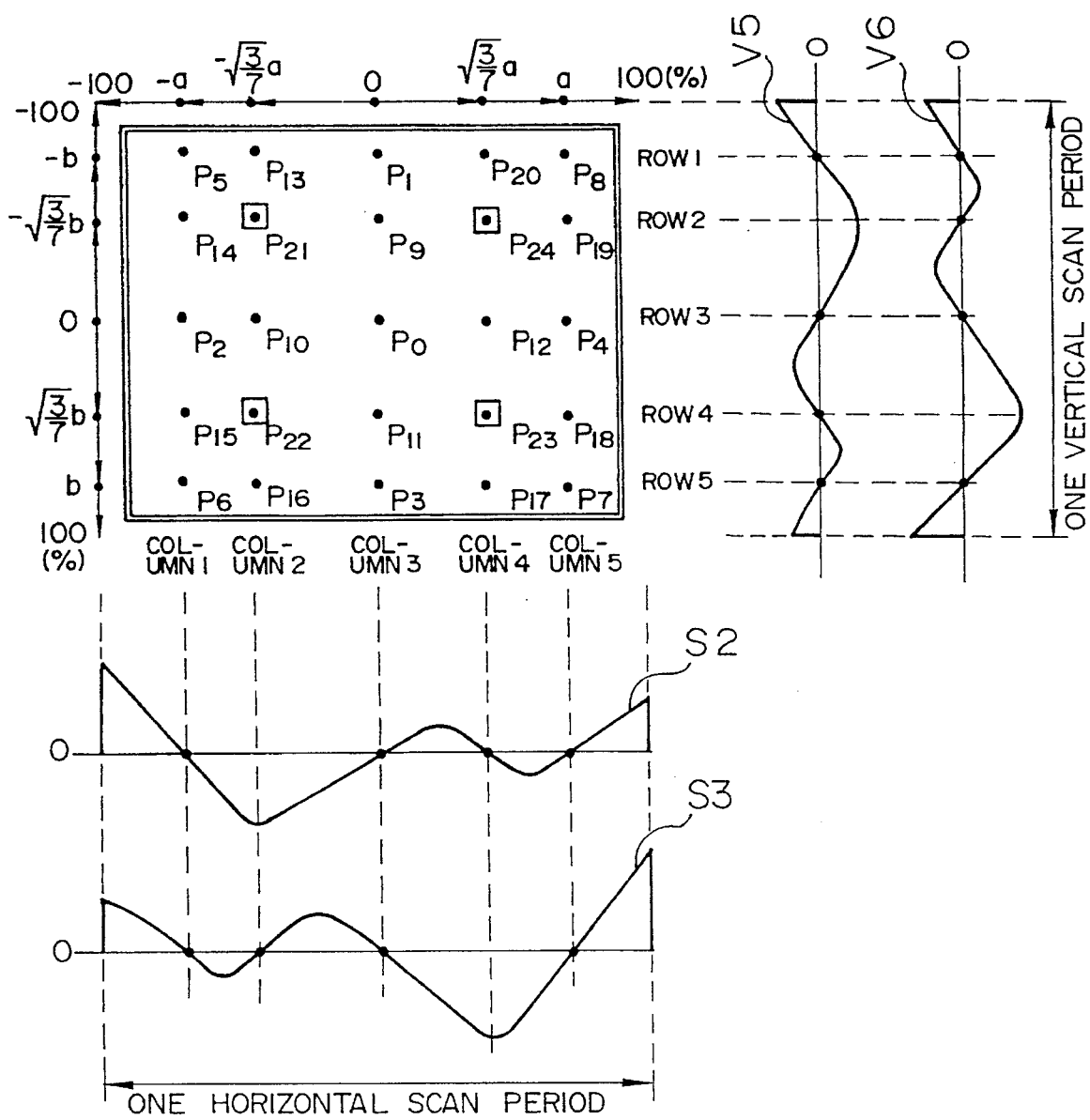
FIG. 19 is an explanatory chart for explaining four-point adjustment.

Finally, in the case where deviation still remains at the remaining points after the adjustment for the above 21 points has been completed by the above-described adjustment, adjustment is carried out for four points P21 to P24 shown in FIG. 19. At this time, adjustment for each of the four points P21 to P24 is carried out by using adjustment-use waveform signals obtained by multiplying together each of fourth order waveform signals S2 and S3 and each of fourth order waveform signals V5 and V6 shown in FIG. 19.

By adjusting operations shown in FIG. 14 through FIG. 16, convergence distortion of second order or a lower order can be compensated. When the compensation cannot be carried out completely, it can be said that distortion of 4th order is produced. In such a case, adjustment is made for each of the 25 points by the method shown in FIG. 17 through FIG. 19 to complete adjustment.

As described above, in the case where there are many adjustment points at each of which there exists deviation relative to each target point, namely, in the case where convergence distortion is of a low order, three points, six points, six points and four points shown in FIG. 14 through FIG. 19, which are points having predetermined priority, are adjusted in this order.

In the above-described embodiment, the order of priority is set such that, for the 25 adjustment points shown in FIG. 11, three-point adjustment for the adjustment points P2, P0 and P4 is first effected, which is followed by nine-point adjustment for the adjustment points P0 to P8, six-point adjustment for the adjustment points P10, P12, P13, P16, P17 and P20, another six-point adjustment for the adjustment points P9, P11, P14, P15, P18 and P19, and four-point adjustment for the adjustment points P21 to P24. The order of priority is for the drive of the convergence deflection yoke for the horizontal direction. The order of priority for the drive of the convergence deflection yoke for the vertical direction is determined such that three-point adjustment for the adjustment points P2, P0 and P4 is first effected, which is followed by nine-point adjustment for the adjustment points P0 to P8, six-point adjustment for the adjustment points P9, P11, P14, P15, P18 and P19, another six-point adjustment for the adjustment points P10, P12, P13, P16, P17 and P20, and four-point adjustment for the adjustment points P21 to P24.

Namely, the 25 adjustment points on the display are divided into groups which include three, six, six and four adjustment points, respectively, and the order of priority is set for these groups of adjustment points. Convergence adjustment is effected from a group of adjustment points having the highest priority in accordance with the order of priority. Therefore, if adjustment is performed in accordance with the above-described order of priority in the case where convergence distortion is of a low order equal to or lower than second order, convergence compensation can be carried out quickly by effecting adjustment for a small number of adjustment points without adjusting all the 25 adjustment points.

In the above-mentioned embodiment, convergence adjustment for each adjustment point is performed by means operating in accordance with the principle of the present invention. In actuality, however, the relationship between a current waveform and a change in magnetic field in an electron gun is not linear, and hence, zero cross points may deviate from predetermined positions on the screen. Hence, actual signals for adjustment may require fine adjustment in which zero cross points on the screen are visually detected for adjustment.

Also, the convergence adjustment technique according to the above-mentioned embodiment is also applicable to automatic convergence adjustment. That is, a television camera is placed in front of a projection screen, and a 9-point or 25-point hatch cross screen in green is projected within the frame of the projection screen. Coordinates of the green points are optically detected and recorded. Subsequently, one red point is projected and detected optically, the deviation between the red point and an associated green point is calculated. This point adjustment is repeated to complete adjustment for red. Then, the same point adjustment is repeated for blue. When this adjustment is completed with nine points or 25 points, convergence adjustment is automatically completed.

As mentioned above, in the convergence adjusting apparatus according to the present invention, adjustment-use waveform signals, each level of which becomes zero at a plurality of adjustment points on a display except for one adjustment point, are generated. The levels of the adjustment-use waveform signals are adjusted in accordance with convergence adjusting signals, and the waveform signals having adjusted levels are supplied to a convergence deflection yoke.

Accordingly, the convergence adjusting apparatus according to the present invention is such that when convergence adjustment is effected for one adjustment point, only one beam spot at the adjustment point to be adjusted is moved without affecting adjustment for other adjustment points. Hence, it is possible to effect convergence adjustment by easy adjusting operations.

In particular, when the convergence of a projection television set or the like is deteriorated at only one point on the display due to ambient magnetic field conditions, after the television set or the like has been installed at home, the deterioration of the convergence can be eliminated by carrying out convergence adjustment for the point only. This allows ordinary users to effect convergence adjustment easily.

Figure 20:
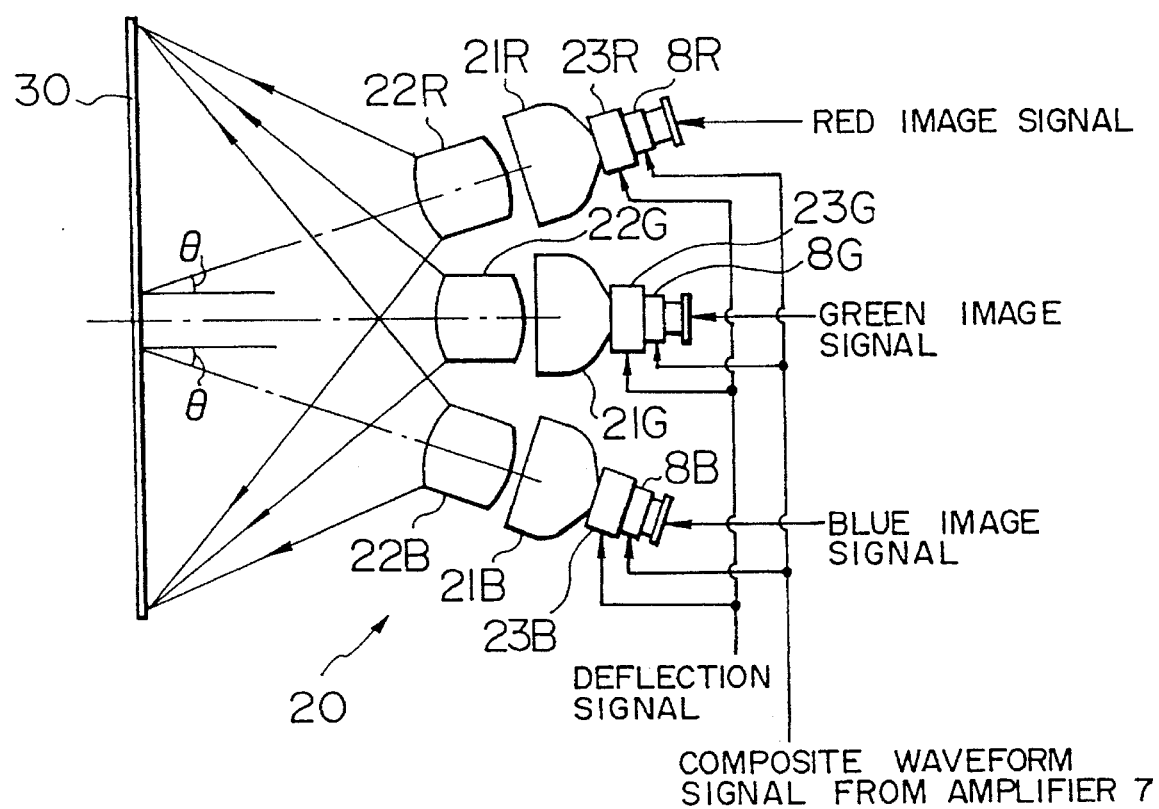
FIG. 20 is a view showing an example of structure of a projection television set of a front projection type.

FIG. 20 is a view showing an example of a projection television set of a front projection type in which the convergence adjusting apparatus according to the present invention is used.

As shown in FIG. 20, a projection tube 21R for red, to which a red fluorescent material is applied, projects an image on a screen 30 via a projection lens 22R in accordance with an image signal for red supplied from an unillustrated image signal generating circuit. The projection tube 21R for red is provided with a deflection yoke 23R for scanning an image beam in the horizontal and vertical directions in accordance with deflecting signals from an unillustrated deflecting circuit. A projection tube 21G for green, to which a green fluorescent material is applied, projects an image on the screen 30 via a projection lens 22G in accordance with an image signal for green supplied from the unillustrated image signal generating circuit. The projection tube 21G for green is provided with a deflection yoke 23G for scanning an image beam in the horizontal and vertical directions in accordance with deflecting signals from the unillustrated deflecting circuit. A projection tube 21B for blue, to which a blue fluorescent material is applied, projects an image on the screen 30 via a projection lens 22B in accordance with an image signal for blue supplied from the unillustrated image signal generating circuit. The projection tube 21B for blue is provided with a deflection yoke 23B for scanning an image beam in the horizontal and vertical directions in accordance with deflecting signals from the unillustrated deflecting circuit. In such television set, light projected from the projection tube 21R for red and light projected from the projection tube 21B for blue enter the screen 30 at an angle Θ with respect to a horizontal direction. Therefore, images projected on the screen 30 suffers from distortion of a trapezoidal shape, which is a so-called "Keystone distortion". For obtaining proper convergence by compensating such distortion, the projection tube 21R for red, the projection tube 21G for green and the projection tube 21B for blue are provided with convergence deflection yokes 8R, 8G and 8B for convergence adjustment in the horizontal and vertical directions, respectively. A composite waveform signal output from the amplifier 7 of the convergence adjusting apparatus as shown in FIG. 6 is supplied to each of the deflection yokes 8R, 8G and 8B. In the convergence adjustment in such a projection television set, among a plurality of predetermined adjustment points, only one adjustment point to be adjusted can be adjusted independently.

Figure 21:
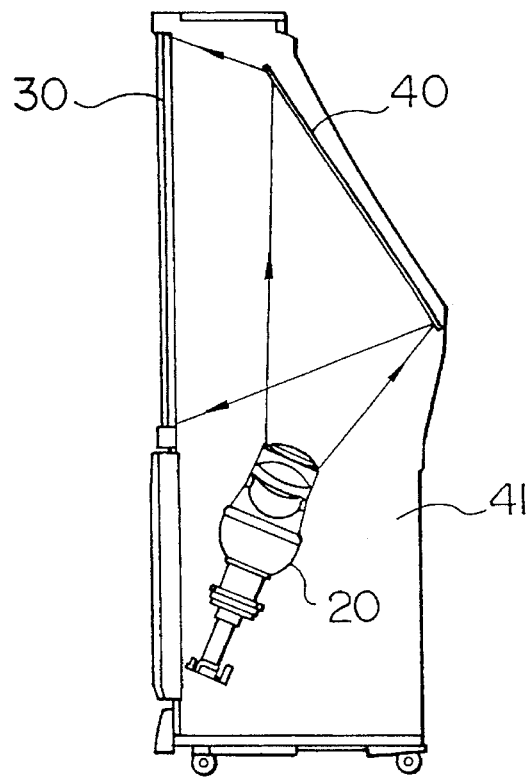
FIG. 21 is a view showing an example of structure of a projection television set of a rear projection type.

Although FIG. 20 shows an structural example of a projection television set of a front projection type in which the convergence adjusting apparatus according to the present invention is used, the convergence adjusting apparatus according to the present invention may be used in a projection television set of a rear projection type as shown in FIG. 21.

The television set shown in FIG. 21 is provided with a projection unit 20 as shown in FIG. 20 which is composed of a projection tube 21R for red, a projection tube 21G for green, a projection tube 21B for blue, projection lenses 22R, 22G and 22B, and convergence deflection yokes 8R, 8G and 8B. The projection unit 20 is arranged in a cabinet 41 which is provided with a screen 30 and a mirror 40. An image projected from the projection unit 20 is reflected by the mirror 40 and is then projected on the screen 30.

What is claimed is:

1. A convergence adjusting apparatus for a display apparatus in which convergence adjustment is effected for a plurality of adjustment points on a display on which a two-dimensional image is formed by a luminescence point moving in horizontal and vertical directions synchronously with horizontal and vertical synchronous signals, said apparatus comprising:

basic waveform signal generating means for generating a direct current waveform signal having a predetermined level as a zero order waveform signal, a sawtooth waveform signal as a first order waveform signal, a parabolic waveform signal as a second order waveform signal, and an n-th order waveform signal, wherein n is an integer equal to or greater than 3 and wherein said sawtooth waveform signal, said parabolic waveform signal, and said n-th order waveform signal are synchronous with said horizontal and vertical synchronous signals;

adjustment-use waveform signal generating means for generating waveform signals for adjustment based on each of the waveform signals obtained by said basic waveform signal generating means, each level of the waveform signals for adjustment becoming zero at said adjustment points on said display except for one adjustment point; and level adjusting means for receiving said waveform signals for adjustment generated by said adjustment-use waveform signal generating means, for adjusting the levels of said waveform signals for adjustment in accordance with convergence adjusting signals, and for supplying a convergence deflection yoke with the waveform signals having adjusted levels.

2. The convergence adjusting apparatus according to claim 1, wherein said adjustment points are set in positions on said display which are arrayed in horizontal and vertical directions.

3. The convergence adjusting apparatus according to claim 2, wherein said adjustment points are set in 25 positions on said display.

4. The convergence adjusting apparatus according to claim 1, wherein said adjustment points are divided into groups each including a predetermined number of said adjustment points, and an order of priority is set for the groups of said adjustment points, and convergence adjustment is effected for the groups of said adjustment points in accordance with an order corresponding to the order of priority.

5. The convergence adjusting apparatus according to claim 1, wherein said display apparatus is a projection television set of a rear projection type which is integrally constructed within a box.

6. The convergence adjusting apparatus according to claim 1, wherein said display apparatus is a projection television set of a front projection type.

7. A projection television set having a projection tube for red, a projection tube for green, a projection tube for blue, deflection yokes for respectively scanning image beams from said projection tubes in horizontal and vertical directions, convergence deflection yokes for convergence adjustment, and projection lenses for converging the image beams from the projection tubes for projection on a screen provided for forming a two-dimensional image thereon, said projection television set including a convergence adjusting apparatus which comprises:

basic waveform signal generating means for generating a direct current waveform signal having a predetermined level as a zero order waveform signal, a sawtooth waveform signal as a first order waveform signal, a parabolic waveform signal as a second order waveform signal, and an n-th order waveform signal, wherein n is an integer equal to or greater than 3 and wherein said sawtooth waveform signal, said parabolic waveform signal, and said n-th order waveform signal are synchronous with horizontal and vertical synchronous signals;

adjustment-use waveform signal generating means for generating waveform signals for adjustment based on each of the waveform signals obtained by said basic waveform signal generating means, each level of the waveform signals for adjustment becoming zero at said adjustment points on said screen except for one adjustment point; and level adjusting means for receiving said waveform signals for adjustment generated by said adjustment-use waveform signal generating means, for adjusting the levels of said waveform signals for adjustment in accordance with convergence adjusting signals, and for supplying a convergence deflection yoke with the waveform signals having adjusted levels, whereby, among beam spots at the adjustment points, only a beam spot at one adjustment point to be adjusted is independently moved.

8. The projection television set according to claim 7, wherein said adjustment points are arrayed on said screen in the horizontal and vertical directions.

9. The projection television set according to claim 8, wherein said adjustment points are provided at twenty five positions on said screen.

10. A convergence adjusting apparatus for a display apparatus in which convergence adjustment is effected for a plurality of adjustment points on a display on which a two-dimensional image is formed by a luminescence point moving in horizontal and vertical directions synchronously with horizontal and vertical synchronous signals, said apparatus comprising:

basic waveform signal generating means for generating a direct current waveform signal having a predetermined level as a zero order waveform signal, a sawtooth waveform signal as a first order waveform signal, and a parabolic waveform signal as a second order waveform signal, wherein said sawtooth waveform signal and said parabolic waveform signal are synchronous with said horizontal and vertical synchronous signals;

adjustment-use waveform signal generating means for generating waveform signals for adjustment based on each of the waveform signals obtained by said basic waveform signal generating means, each level of the waveform signals for adjustment becoming zero at said adjustment points on said display except for one adjustment point; and level adjusting means for receiving said waveform signals for adjustment generated by said adjustment-use waveform signal generating means, for adjusting the levels of said waveform signals for adjustment in accordance with convergence adjusting signals, and for supplying a convergence deflection yoke with the waveform signals having adjusted levels.

11. The convergence adjusting apparatus according to claim 10, wherein said adjustment points are set in positions on said display which are arrayed in horizontal and vertical directions.

12. The convergence adjusting apparatus according to claim 11, wherein said adjustment points are set in nine positions on said display.

13. The convergence adjusting apparatus according to claim 10, wherein said adjustment points are divided into groups each including a predetermined number of said adjustment points, and an order of priority is set for the groups of said adjustment points, and convergence adjustment is effected for the groups of said adjustment points in accordance with an order corresponding to the order of priority.

14. The convergence adjusting apparatus according to claim 10, wherein said display apparatus is a projection television set of a rear projection type which is integrally constructed within a box.

15. The convergence adjusting apparatus according to claim 10, wherein said display apparatus is a projection television set of a front projection type.

16. A projection television set having a projection tube for red, a projection tube for green, a projection tube for blue, deflection yokes for respectively scanning image beams from said projection tubes in horizontal and vertical directions, convergence deflection yokes for convergence adjustment, and projection lenses for converging the image beams from the projection tubes for projection on a screen provided for forming a two-dimensional image thereon, said projection television set including a convergence adjusting apparatus which comprises:

basic waveform signal generating means for generating a direct current waveform signal having a predetermined level as a zero order waveform signal, a sawtooth waveform signal as a first order waveform signal, and a parabolic waveform signal as a second order waveform signal, wherein said sawtooth waveform signal and said parabolic waveform signal are synchronous with horizontal and vertical synchronous signals;

adjustment-use waveform signal generating means for generating waveform signals for adjustment based on each of the waveform signals obtained by said basic waveform signal generating means, each level of the waveform signals for adjustment becoming zero at said adjustment points on said screen except for one adjustment point; and level adjusting means for receiving said waveform signals for adjustment generated by said adjustment-use waveform signal generating means, for adjusting the levels of said waveform signals for adjustment in accordance with convergence adjusting signals, and for supplying a convergence deflection yoke with the waveform signals having adjusted levels, whereby, among beam spots at the adjustment points, only a beam spot at one adjustment point to be adjusted is independently moved.

17. The projection television set according to claim 16, wherein said adjustment points are arrayed on said screen in the horizontal and vertical directions.

18. The projection television set according to claim 17, wherein said adjustment points are provided at nine positions on said screen.

* * * * *